(12) United States Patent
Chowdhury

(10) Patent No.: US 7,827,219 B2
(45) Date of Patent: Nov. 2, 2010

(54) METHOD FOR ENCODING, TRAVERSING, MANIPULATING AND QUERYING A TREE

(75) Inventor: Sandeep Chowdhury, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/039,827

(22) Filed: Feb. 29, 2008

(65) Prior Publication Data

US 2009/0222473 A1    Sep. 3, 2009

(51) Int. Cl.
*G06F 12/00* (2006.01)
*G06F 17/30* (2006.01)
(52) U.S. Cl. ..................................................... 707/899
(58) Field of Classification Search ........................ None
See application file for complete search history.

(56) References Cited

U.S. PATENT DOCUMENTS 7,003,675 B2    2/2006    Benaloh

FOREIGN PATENT DOCUMENTS

WO    0113571 A1    2/2001

OTHER PUBLICATIONS

Wu, Xiaodong; Lee, Mong L.; Hsu, Wynne; "A Prime Number Labeling Scheme for Dynamic Ordered XML Trees"; Proceedings of the 20th International Conference on Data Engineering; 2004.
Liang, Zuo-Peng; Wu, Wen-Ming; Dong, Yi-Sheng; "Clustering XML Documents Based on a Structural Summary Tree"; Journal of Applied Sciences; vol. 23, No. 1; Jan. 2005; pp. 71-74.
Torres-Jimenez, Jose; Romero, David; "Linear Algorithms for Encoding/Decoding Directed Labelled Trees Suitable for a Genetic Algorithm"; WSEAS Transactions on Systems; vol. 2, No. 4; Oct. 2003; p. 1079-1081.

*Primary Examiner*—Pierre M Vital
*Assistant Examiner*—Jason Liao
(74) *Attorney, Agent, or Firm*—Jeanine S. Ray-Yarletts, Esq.; Steven M. Greenberg, Esq.; Carey, Rodriguez Greenberg & Paul LLP

(57) ABSTRACT

Embodiments of the invention include a method for encoding a tree. The method includes receiving an input tree of many nodes organized in a parent-child hierarchy with parent nodes being coupled to one or more child nodes. A node ID is assigned to each of the nodes of the input tree. A representation between each parent node and child node associated with the parent node can be generated and a tree code can be computed from prime numbers in the natural sequence of numbers and the assigned node Ids. Finally, the tree code representative of the input tree is stored.

19 Claims, 11 Drawing Sheets

100

510

| Parent Id | 1 | 1 | 3 | 3 |
|---|---|---|---|---|
| Child Id | 2 | 3 | 4 | 5 |

Parent-Child ID Map

$T1 = 100$

520

| Parent Id | 1 | 2 | 2 |
|---|---|---|---|
| Child Id | 2 | 3 | 4 |

Parent-Child ID Map

$T2 = 18$

530

| Parent Id | 1 | 1 | 1 | 1 | 3 | 4 | 5 | 5 | 6 | 6 | 7 | 7 |
|---|---|---|---|---|---|---|---|---|---|---|---|---|
| Child Id | 2 | 3 | 4 | 5 | 6 | 7 | 8 | 9 | 10 | 11 | 12 | 13 |
| Parent Child Id Map ||||||||||||| |

T = 3309466160

710                    720

730                    740

800

900

1000

1100

METHOD FOR ENCODING, TRAVERSING, MANIPULATING AND QUERYING A TREE

FIELD OF THE INVENTION

The present invention relates generally to data structures, and more particularly to the encoding, traversing, manipulating and querying of tree structures.

BACKGROUND

Various methods for encoding trees are known. N. Deo and P. Micikevicius, "*Pfüfer-Like Codes for Labeled Trees*", Congressus Numerantium, 151, pp. 65-73, (2001) describe a method of encoding a tree by iteratively deleting the nodes of the tree. The original tree can be obtained by decoding the tree code. The same authors, in a paper titled "*A New Encoding for Labeled Trees Employing a Stack and a Queue*", Bulletin of the Institute of Combinatorics and its Applications, 34, pp. 77-85, (2002) describe another tree encoding method using a stack and queue. This method of encoding additionally allows for the determination of the centre(s), radius, and diameter of a tree without having to explicitly construct the tree.

X. Wu et al., "A prime number labelling scheme for dynamic ordered XML trees" Proceedings of $20^{th}$ ICDE'04, 2004 (ISBN 0 7695 2065 0), describe a scheme for labelling element nodes of trees using prime numbers, where the relationships between nodes can be determined by comparing the node labels. A global order of the nodes is captured by generating simultaneous congruence values from the prime number node labels.

A disadvantage with known tree encoding methods, however, is that they do not directly provide sufficient information regarding the tree itself from the tree's tree code. A user is required to parse/browse the actual tree to obtain such information. A further disadvantage is in parsing/browsing an embodied tree to obtain information about the tree compared to being able to obtain the same information by performing computations on the tree code. Namely, it is faster to perform computations on the tree code to obtain information about the tree, rather than to parse/browse the tree for the same. This is especially true if the tree (for example embodying XML data) is stored in an external storage device such as a file system that is read for each access. It is further easier to transfer a tree code to a remote location for processing, rather than to transfer an embodied tree like an XML document.

Moreover, trees are present in the field of software engineering in several embodiments such as, as XML data, object trees of object-oriented programming languages, and so forth. Each different tree embodiment requires a parsing implementation specific to the tree embodiment. parsing/browsing two different tree embodiments would therefore require the use of two different implementations since the method of parsing an XML tree would be different to that for parsing an object tree. Tree codes on the other hand may be used to represent all such heterogeneous embodiments with the same convention. A common set of computations can then be performed on tree codes representing the heterogeneous tree embodiments.

SUMMARY

The present invention discloses a method of encoding a tree structure and associated methods of traversing, manipulating and querying the tree. As tree structures are widely used in the field of computer science (as document formats like XML, as object trees of object-oriented programming languages, as XML and object databases etc), genetic analysis and other fields of science, the methods disclosed in this invention will be advantageous in analysing and indexing tree structures.

According to an aspect of the invention, a method for encoding a tree, comprising the steps of receiving an input tree comprising a number of nodes, assigning each node of the input tree with a node ID, generating a mapping between each parent node of the input tree and the number of children of the parent node, computing a tree code for uniquely representing the structure of the input tree and storing the computed tree code as an encoded tree structure representative of the input tree.

According to another aspect of the invention, a method for traversing a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of a) obtaining a parent-child ID map of the tree structure, b) receiving as input an origin node and a destination node, c) locating the origin node in the parent-child ID map, d) identifying, in the parent-child ID map, a corresponding parent node of the origin node, and e) determining if the parent node is the destination node. If the parent node is not the destination node, steps c) to e) are repeated with the parent node as the origin node, and if the parent node is the destination node, the method further comprises generating a list of nodes traversed.

According to another aspect of the invention, a method for traversing a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of a) obtaining a parent-child ID map of the tree structure, b) receiving as input an origin node, c) locating the origin node in the parent-child ID map, d) identifying, in the parent-child ID map, child nodes corresponding to the origin node, and e) determining if any of the child nodes are parent nodes. If at least one or more of the child nodes is a parent node, steps c) to e) are repeated with each of the one or more child nodes as the origin node, and if none of the child nodes are a parent node, the method further comprises generating a list of nodes traversed.

According to another aspect of the invention, a method for manipulating and querying a tree encoded to include a tree code uniquely representing the structure of the tree and a parent-child table mapping each parent node of the tree to the number of child nodes of each parent node, comprises the step of obtaining a parent-child table of the tree and summing each entry of the parent-child table corresponding to the number of children of a parent, wherein the number of links in the tree is determined.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of receiving a first input node, traversing the tree in accordance with the following steps: a) obtaining a parent-child ID map of the tree structure, b) locating the first input node in the parent-child ID map, c) identifying, in the parent-child ID map, a corresponding parent node of the located node, and d) determining if the parent node is the root node of the tree, wherein e) if the parent node is not the root node, the traversing further locates the parent node in the parent-child ID map and repeats steps c) to e), and calculating the number of iterations of steps c) to e) performed. The level of the first input node is determined.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the step of generating a first set of nodes consisting of all child nodes in the parent-child ID map not listed as parent nodes, wherein the leaf nodes of the tree are identified.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of obtaining a parent-child ID map of the tree, receiving a first input node, identifying from the parent-child ID map, all elements of the map listing the first node as a parent, and generating a set of nodes consisting of the child nodes corresponding to each identified element of the map., whereby child nodes of the first node are identified.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of receiving a first input node, traversing the tree in accordance with the following steps: a) obtaining a parent-child ID map of the tree structure, b) locating the first input node in the parent-child ID map, c) identifying, in the parent-child ID map, a corresponding parent node of the located node, and d) determining if the parent node is the root node of the tree, wherein e) if the parent node is not the root node, the traversing further locates the parent node in the parent-child ID map and repeats steps c) to e), and generating a first set of nodes consisting of the nodes involved with the traversal.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of receiving a first input node, and traversing the tree in accordance with the following steps: a) obtaining a parent-child ID map of the tree structure, b) locating the first input node in the parent-child ID map, c) identifying, in the parent-child ID map, child nodes corresponding to the located node, and d) determining if any of the child nodes are parent nodes, wherein e) if at least one or more of the child nodes is a parent node, the traversing further, for each child node that is a parent node, locates the child node in the parent-child ID map and repeats steps c) to e).

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of obtaining a parent-child ID map of the tree, receiving a first input node, locating the first node as a child node in the parent-child ID map, and identifying the corresponding parent node of the child node in the parent-child ID map, whereby the parent of the first node is identified.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of: a) obtaining a parent-child ID map of the tree, b) identifying the largest node ID of the tree, c) receiving a first input node, d) locating the first input node as a child node in the parent-child ID map, e) identifying the corresponding parent node of the child node in the parent-child ID map, f) traversing the tree in accordance with the following steps: i) obtaining a parent-child ID map of the tree structure, ii) locating the first input node in the parent-child ID map, iii) identifying, in the parent-child ID map, child nodes corresponding to the located node, and iv) determining if any of the child nodes are parent nodes, wherein v) if at least one or more of the child nodes is a parent node, the traversing further locates, for each child nodes that is a parent node, the child node in the parent-child ID map, and repeats steps iii) to v), g) generating a first set of nodes consisting of all nodes involved with the traversal, and h) calculating the number of nodes in the first set. If the number of nodes in the first set is equal to a predetermined number, the method further comprises the step of outputting the node ID of the parent node as the fragment ID of a bottom fragment of the tree having the predetermined number of nodes, and if the number of nodes in the first set is less than the predetermined number, and the node ID of the parent node is not 1, steps d) to h) are repeated.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, wherein the parent-child ID map includes a parent row listing the node IDs of all parent nodes, and further includes a first child row listing the node IDS of all child nodes, comprises the steps of:

obtaining the parent-child ID map, receiving as input a first node, a sibling sequence number, and a predetermined number indicative of a number of nodes to be added to the tree, locating, in the parent-child ID map, the first column in the parent row containing the node ID of the first node, adding the sibling sequence number to the column number of the first column, summing the sibling sequence number, the column number, and the predetermined number and storing the resultant sum as a first column index, creating a second child row in the parent-child ID map, the node IDs of the second child row in columns equal to or less than the first column index being the same as the node IDs of the first child row, and the node IDs of the second child row in columns greater than the first column index being incremented by the predetermined number, generating a relabel map from the first child row and the second child row, updating the node IDs of the parent row in accordance with the relabel map, creating a number of new columns in the parent-child ID map equal to the predetermined number, the new columns being created immediately after the column of the first column index, entering the node ID of the first node in the parent row of the new columns, and renumbering all node IDs in the child row with a sequential sequence of numbers beginning from 2, whereby a number of nodes equal to the predetermined number is added as child nodes to the first node at a sibling sequence equal to the sibling sequence number.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of a)obtaining a parent-child ID map of the tree, b)generating a parent-child relationship map from the parent-child ID map, each entry of the parent-child relationship map having as a key a parent node ID, and as values, child node IDs corresponding to the parent node, the parent-child relationship map having a number of rows equal to the number of parent nodes, c)obtaining a parent node ID key from the lowest row of the parent-child relationship map and locating a row of the parent-child ID map having the parent node ID key as a value, d)adding the value corresponding to the parent node ID key to the values of the row having the parent node ID key as a value, and e)deleting the lower most row from the parent-child relationship map. If the parent-child relationship map has more than one row, the method further comprises the steps of repeating steps c) to e), and if the parent-child relationship map has only one row, the method further comprises the step of generating a first set of nodes containing the nodes in the one remaining row of the parent-child relationship map, whereby the first set of nodes is a list of nodes sorted in depth-first order.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of a)receiving as input a predetermined number indicative of the number of nodes in a self-similar unit to be detected, b)obtaining a parent-child ID map for the tree, c)determining the number of edges in the tree from the number of columns in the parent-child ID map, d)determining the number of nodes in the tree as one greater than the number of edges, and e)determining if a bottom fragment of the tree having the predetermined number of nodes exists. If the bottom fragment having the predetermined number of nodes does not exists, it is determined that the tree is not self-similar, and step e) is repeated until a predetermined condition is satisfied.

According to another aspect of the invention, a method for manipulating and querying a tree encoded to include a tree code uniquely representing the structure of the tree, a parent-child table mapping each parent node of the tree to the number of child nodes of each parent node, and a parent-child ID map mapping a parent-node to a corresponding child node, comprises the steps of obtaining a parent-child ID map from a tree code of the tree, determining the number of edges in the tree from the number of columns in the parent-child ID map, determining the number of nodes in the tree as one greater than the number of edges, calculating all mathematical factors of the number of edges, generating a list of probable self-similar units by incrementing each factor by 1, determining self-similarity in the tree according to the method of claim 31 providing each entry of the list as the predetermined number.

According to another aspect of the invention, a computer readable medium has recorded therein a program operable to instruct a computer to perform a method for encoding a tree. The method comprises the steps of receiving an input tree comprising a number of nodes, assigning each node of the input tree with a node ID, generating a mapping between each parent node of the input tree and the number of children of the parent node, computing a tree code for uniquely representing the structure of the input tree and storing the computed tree code as an encoded tree structure representative of the input tree.

According to another aspect of the invention, a computer readable medium has recorded therein a program operable to instruct a computer to perform a method for traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of a) obtaining a parent-child ID map of the tree structure, b) receiving as input an origin node and a destination node, c) locating the origin node in the parent-child ID map, d) identifying, in the parent-child ID map, a corresponding parent node of the origin node, and e) determining if the parent node is the destination node, wherein if the parent node is not the destination node, steps c) to e) are repeated with the parent node as the origin node, and if the parent node is the destination node, the method further comprises generating a list of nodes traversed.

According to another aspect of the invention, a computer readable medium has recorded therein a program operable to instruct a computer to perform a method for traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of a) obtaining a parent-child ID map of the tree structure, b) receiving as input an origin node, c) locating the origin node in the parent-child ID map, d) identifying, in the parent-child ID map, child nodes corresponding to the origin node, and e) determining if any of the child nodes are parent nodes. If at least one or more of the child nodes is a parent node, steps c) to e) are repeated with each of the one or more child nodes as the origin node.

According to another aspect of the invention, a computer readable medium has recorded therein a program operable to instruct a computer to perform a method for manipulating and traversing a tree, the tree encoded to include a tree code uniquely representing the structure of the tree, and a parent-child table mapping each parent node of the tree to the number of child nodes of each parent node, and the method comprising the step of obtaining a parent-child table of the tree and summing each entry of the parent-child table corresponding to the number of children of a parent, wherein the number of links in the tree is determined.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of receiving a first input node, and traversing the tree in accordance with the following steps: a) obtaining a parent-child ID map of the tree structure, b) locating the first input node in the parent-child ID map, c) identifying, in the parent-child ID map, a corresponding parent node of the located node, and d) determining if the parent node is the root node of the tree, wherein e) if the parent node is not the root node, the traversing further locates the parent node in the parent-child ID map and repeats steps c) to e).

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the step of generating a first set of nodes consisting of all child nodes in the parent-child ID map not listed as parent nodes, wherein the leaf nodes of the tree are identified.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of obtaining a parent-child ID map of the tree, receiving a first input node, identifying from the parent-child ID map, all elements of the map listing the first node as a parent, and generating a set of nodes consisting of the child nodes corresponding to each identified element of the map, whereby child nodes of the first node are identified.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of receiving a first input node, and traversing the tree in accordance with the following steps: a) obtaining a parent-child ID map of the tree structure, b) locating the first input node in the parent-child ID map, c) identifying, in the parent-child ID map, child nodes corresponding to the located node, and d) determining if any of the child nodes are parent nodes, and e) wherein. if at least one or more of the child nodes is a parent node, the traversing further, for each child node that is a parent node, locates the child node in the parent-child ID map and repeats steps c) to e).

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of obtaining a parent-child ID map of the tree, receiving a first input node, locating the first node as a child node in the parent-child ID map, and identifying the corresponding parent node of the child node in the parent-child ID map, whereby the parent of the first node is identified.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of a) obtaining a parent-child ID map of the tree, b) identifying the largest node ID of the tree, c) receiving a first input node, d) locating the first input node as a child node in the parent-child ID map, e) identifying the corresponding parent node of the child node in the parent-child ID map, f) traversing the tree in accordance with the following steps: i) obtaining a parent-child ID map of the tree structure, ii) locating the first input node in the parent-child ID map, iii) identifying, in the parent-child ID map, child nodes corresponding to the located node, and iv) determining if any of the child nodes are parent nodes, wherein v) if at least one or more of the child nodes is a parent node, the traversing further locates, for each child nodes that is a parent node, the child node in the parent-child ID map, and repeats steps iii) to v), g) generating a first set of nodes consisting of all nodes involved with the traversal, and h) calculating the number of nodes in the first set. If the number of nodes in the first set is equal to a predetermined number, the method further comprises the step of outputting the node ID of the parent node as the fragment ID of a bottom fragment of the tree having the predetermined number of nodes, and if the number of nodes in the first set is less than the predetermined number, and the node ID of the parent node is not 1, steps d) to h) are repeated.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of obtaining the parent-child ID map, receiving as input a first node, a sibling sequence number, and a predetermined number indicative of a number of nodes to be added to the tree, locating, in the parent-child ID map, the first column in the parent row containing the node ID of the first node, adding the sibling sequence number to the column number of the first column, summing the sibling sequence number, the column number, and the predetermined number and storing the resultant sum as a first column index, creating a second child row in the parent-child ID map, the node IDs of the second child row in columns equal to or less than the first column index being the same as the node IDs of the first child row, and the node IDs of the second child row in columns greater than the first column index being incremented by the predetermined number, generating a relabel map from the first child row and the second child row, updating the node IDs of the parent row in accordance with the relabel map, creating a number of new columns in the parent-child ID map equal to the predetermined number, the new columns being created immediately after the column of the first column index, entering the node ID of the first node in the parent row of the new columns, and renumbering all node IDs in the child row with a sequential sequence of numbers beginning from 2, whereby a number of nodes equal to the predetermined number is added as child nodes to the first node at a sibling sequence equal to the sibling sequence number.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of obtaining a parent-child ID map of the tree, generating a first set of nodes consisting of all nodes listed as child nodes in the parent-child ID map but not listed as parent nodes, receiving as input a root node of a fragment of the tree, traversing the tree in accordance with the following steps: a) obtaining a parent-child ID map of the tree structure, b) locating the root node in the parent-child ID map, c) identifying, in the parent-child ID map, child nodes corresponding to the located node, and d) determining if any of the child nodes are parent nodes, wherein e) if at least one or more of the child nodes is a parent node, the traversing further locates, for each child nodes that is a parent node, the child node in the parent-child ID map, and repeats steps c) to e), generating a second set of nodes consisting of the nodes involved with the traversal, and comparing the first set of nodes with the second set of nodes, and generating a third set of nodes which are common to both the first set and second set of nodes, whereby the leaf nodes of the fragment are identified.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of a) obtaining a parent-child ID map of the tree, b) generating a parent-child relationship map from the parent-child ID map, each entry of the parent-child relationship map having as a key a parent node ID, and as values, child node IDs corresponding to the parent node, the parent-child relationship map having a number of rows equal to the number of parent nodes, c) obtaining a parent node ID key from the lowest row of the parent-child relationship map and locating a row of the parent-child ID map having the parent node ID key as a value, d) adding the value corresponding to the parent node ID key to the values of the row having the parent node ID key as a value, and e) deleting the lower most row from the parent-child relationship map, wherein if the parent-child relationship map has more than one row, the method further comprises the steps of repeating steps c) to e), and if the parent-child relationship map has only one row, the method further comprises the step of generating a first set of nodes containing the nodes in the one remaining row of the parent-child relationship map, whereby the first set of nodes is a list of nodes sorted in depth-first order.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of: a) receiving as input a predetermined number indicative of the number of nodes in a self-similar unit to be detected, b) obtaining a parent-child ID map for the tree, c) determining the number of edges in the tree from the number of columns in the parent-child ID map, d) determining the number of nodes in the tree as one greater than the number of edges, and e) determining if a bottom fragment of the tree having the predetermined number of nodes exists, wherein if the bottom fragment having the predetermined number of nodes does not exists, it is determined that the tree is not self-similar, and step e) is repeated until a predetermined condition is satisfied.

According to another aspect of the invention, a computer readable medium has recorded therein a program operable to instruct a computer to perform a method for manipulating and traversing a tree. The tree is encoded to include a tree code uniquely representing the structure of the tree, a parent-child table mapping each parent node of the tree to the number of child nodes of each parent node, and a parent-child ID map mapping a parent-node to a corresponding child node. The method comprises the steps of obtaining a parent-child ID map from a tree code of the tree, determining the number of edges in the tree from the number of columns in the parent-child ID map, determining the number of nodes in the tree as one greater than the number of edges, calculating all mathematical factors of the number of edges, generating a list of probable self-similar units by incrementing each factor by 1, and determining self-similarity in the tree according to the method of claim 65 providing each entry of the list as the predetermined number.

According to another aspect of the invention, a method for decoding a tree, comprises the steps of factorizing a tree code into one or more prime numbers in ascending order, each prime number factor being raised to an associated power, replacing each prime number by a respective index, creating a parent-child table comprising a parent row and a child row, the parent row containing each of the indices and the child row containing each of the associated powers, and creating a parent-child ID map comprising a parent row and a child row, the parent row of the parent-child ID map containing each element of the parent row of the parent-child table, and the child row of the parent-child ID map containing sequence of natural numbers starting from 2.

BRIEF DESCRIPTION OF THE DRAWINGS

Embodiments of the present invention are described with reference to the drawings, in which.

DETAILED DESCRIPTION

Figure 1:
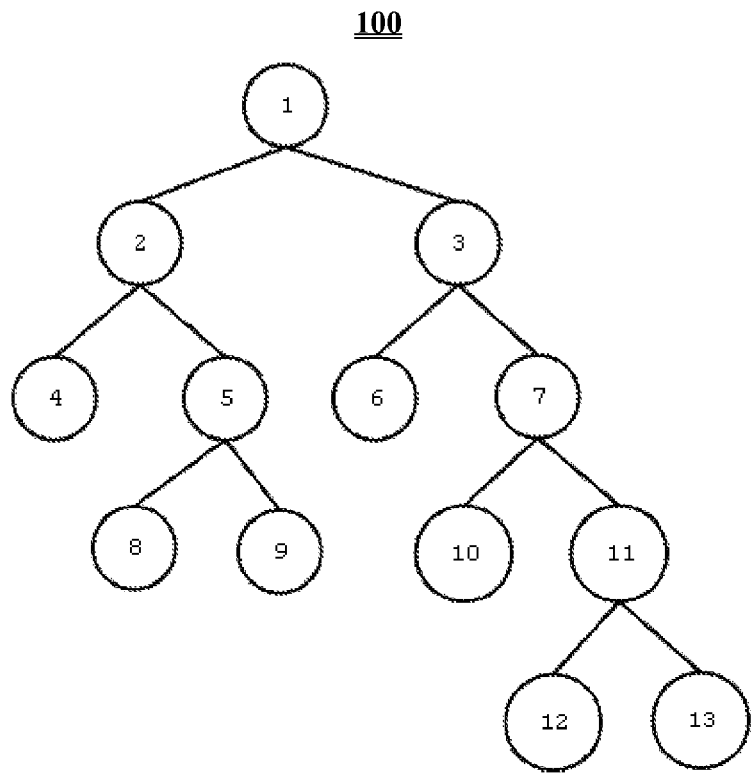
FIG. 1 shows a tree structure to which an embodiment of the invention is applied.

An embodiment of the invention is described with reference to the exemplary tree structure 100 of FIG. 1. In FIG. 1, each node of the tree 100 is assigned a node ID. The node IDs of each node remain the same as long as the tree structure remains the same. Adding or deleting nodes to/from the tree may require the nodes to be relabelled.

Node IDs are assigned to the nodes of the tree structure according to the following rules:

The root node in a tree structure is assigned node ID 1.

As the tree structure is traversed from node to node, each node is assigned a node ID one greater than the previously assigned node ID.

Assignment of node IDs in the tree structure is complete when all nodes are assigned a number.

In any one level (nodes of the same depth) of the tree structure, the nodes are traversed from left to right.

When the last node of a level in the tree structure is reached, the next node to traverse (if it exists) in the tree structure is the first node of the next level In the above manner, all nodes of the tree structure are traversed and each node is assigned a distinct node ID. As the first node ID is labelled 1, the last node ID has a label that is equivalent to the total number of nodes in the tree structure.

In the tree structure of FIG. 1, a node having at least one child node is termed a parent node. For example, node 3 is a parent node since it has a child node 7. A node of the tree structure having no child nodes is termed a leaf node. For example, node 8 in the tree structure is a leaf node.

A subtree of the tree structure is referred to as a fragment of the tree structure, or a tree fragment. For example the subtree containing nodes 7, 10, 11, 12, and 13 is a fragment of the tree structure. The node ID of the root node of a tree fragment is the fragment ID of the tree fragment. When only the first N nodes of a tree fragment are referred to, the tree fragment is referred to as the fragment with N nodes. For example, the first 3 nodes of fragment 7, that is, the tree fragment including nodes 7, 10, and 11, are referred to as fragment 7 of the tree with 3 nodes.

In referring to the child nodes of a parent node, the first child node of a parent node is given a sibling sequence of 1, the second child node has a sibling sequence of 2, and so forth. A tree fragment which follows a particular sibling is termed a tree fragment with that sibling sequence. For example, the nodes 7, 11, 12, and 13 make up a tree fragment having a fragment ID of 7 and a sibling sequence of 2. On the other hand, the nodes with fragment ID 7 and sibling sequence 1 are nodes 7 and 10. Additionally, the tree fragment having fragment ID 7, a sibling sequence of 2, and a number of nodes equal to 3, contains nodes 7, 11, and 12.

If only the first N nodes of the tree fragment are considered, the leaf nodes of the remaining tree fragment are termed as the leaf nodes of the tree fragment with N nodes. For example, the leaf nodes of tree fragment 7 with 3 ynodes refers to nodes 10 and 11, though the full tree fragment 7 also has nodes 12 and 13 as leaf nodes.

A tree fragment with N nodes including the largest leaf node of the tree structure (node having the largest node ID) is termed the bottom tree fragment with N nodes. For example, the bottom tree fragment 100 with 5 nodes refers to the tree fragment having a fragment ID 7. There is no bottom tree fragment with 4 nodes, but there is a bottom tree fragment with 3 nodes, which refers to the tree fragment having fragment ID 11.

According to the disclosed embodiments, a Parent-Child Table and a Parent-Child ID Map are generated and employed to realize tree encoding, and to perform tree analysis and manipulation.

The Parent-Child Table of a tree structure is a table mapping each parent node of the tree to the number of children it has. A Parent-Child Table for the tree 100 of FIG. 1 is:

| Parent-Child Table | | | | | | |
|---|---|---|---|---|---|---|
| Parent Node ID | 1 | 2 | 3 | 5 | 7 | 11 |
| Number of children | 2 | 2 | 2 | 2 | 2 | 2 |
| Column No. (for reference) | 1 | 2 | 3 | 4 | 5 | 6 |

Figure 2:
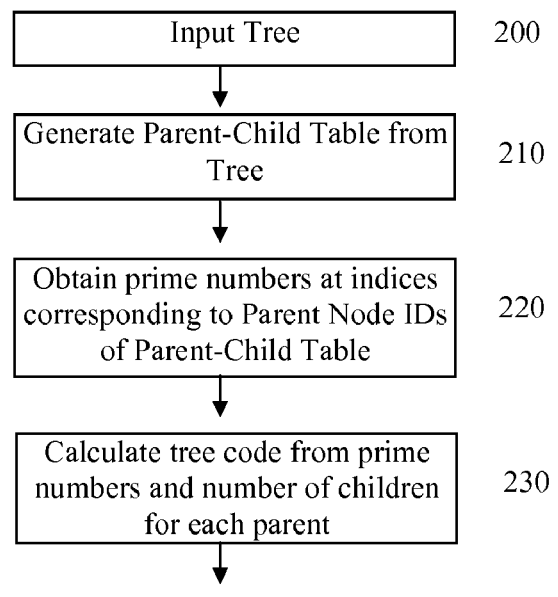
FIG. 2 illustrates an operation of calculating a tree code of a tree.

The Parent-Child Table is used to calculate a tree code of the tree structure, which uniquely represents the tree structure of the tree. Two trees are defined to have the same tree structure if the number of child nodes is the same for every node having the same node ID. Calculation of a tree code for a tree is described with reference to FIG. 2.

The Parent-Child Table for an input tree is first generated (Block 210). The Parent-Child Table has the general form:

| Parent-Child Table | | | | |
|---|---|---|---|---|
| Parent Node IDs | $n_1$ | $n_2$ | ... | $n_k$, |
| Number of Children | $m_1$ | $m_2$ | ... | $m_k$ |

Taking each parent node ID of the Parent-Child Table as an index to the natural sequence of prime numbers, the prime numbers corresponding to each index is obtained (Block 220).

The tree code of a tree is calculated from the Parent-Child Table as:

Tree Code=$p_{n1}{}^{m1} * p_{n2}{}^{m2} * \ldots * p_{nk}{}^{mk}$, (Block 230)

where $p_{ni}$ is the $ni^{th}$ prime number in the natural sequence of numbers and ni is the $i^{th}$ node ID in the parent node row of the Parent-Child Table. The tree code for the tree structure of FIG. 1, referring to its Parent-Child Table above, is hence:

$$\text{Tree Code} = (1^{st} \text{ prime})^2 * (2^{nd} \text{ prime})^2 * (3^{rd} \text{ prime})^2 *$$
$$(5^{th} \text{ prime})^2 * (7^{th} \text{ prime})^2 * (11^{th} \text{ prime})^2$$
$$= 2^2 * 3^2 * 5^2 * 11^2 * 17^2 * 31^2$$
$$= 30244688100$$

The Parent-Child ID Map maps each parent node in the tree to its corresponding child node.

The Parent-Child ID Map of the tree 100 is:

| Parent-Child ID Map | | | | | | | | | | | |
|---|---|---|---|---|---|---|---|---|---|---|---|
| Parent Node ID | 1 | 1 | 2 | 2 | 3 | 3 | 5 | 5 | 7 | 7 | 11 | 11 |
| Child Node ID | 2 | 3 | 4 | 5 | 6 | 7 | 8 | 9 | 10 | 11 | 12 | 13 |

The Parent-Child ID Map of the tree structure contains information sufficient to re-construct the tree. Each column of the Parent-Child ID Map corresponds to a link in the tree and identifies the nodes the link connects. For example the first column represents the link between nodes 1 and 2. Therefore the number of columns in the Parent-Child ID Map is equal to the number of edges in the tree structure, which is one less than the number of nodes in the tree.

Due to the manner in which the node IDs are assigned, the child row of the table is always a sequence of numbers beginning from 2. The product of prime numbers corresponding to the elements of the Parent Row, where each Parent Row element is taken as an index to a prime number, gives the Tree Code of the tree. The tree structure ID, Parent-Child Table and Parent-Child ID Map are inter-derivable, such that one can be obtained from any one of the others.

Tree traversal is realized using the Parent-Child ID Map. For example, a Leftward Traversal, which is a recursive traversal of the tree leftwards from an origin until the root node (destination node) is reached, can be realized using the tree's corresponding Parent-Child ID Map. A leftward traversal from node 11 is realized by the following operations:

1. Locate node 11 in the Child row of the Parent-Child ID Map. (i.e. column 10).
2. Identify the corresponding parent of node 11 from column 10 of the Parent row. (i.e. node 7).
3. Locate node 7 in the Child row of the Parent-Child ID Map. (i.e. column 6).
4. Identify the corresponding parent of node 7 from column 6 of the Parent row. (i.e. node 3).
5. Locate node 3 in the Child row of the Parent-Child ID Map. (i.e. column 2).
6. Identify the corresponding parent of node 3 from column 2 (i.e. node 1).

When the root node (node 1) is reached, traversing the tree is stopped. The summary of the above traversal operation beginning from node 11 is:

11→7
7→3
3→1

From the above operation, it can be determined that the number of traversals involved is 3, and that the nodes involved in the traversal are 1, 3, 7 and 11 in ascending order. In this manner, child-parent associations are also defined.

Similarly, a rightward traversal, which is a recursive traversal of the tree rightwards from a particular node (origin node), until a leaf node (destination node) is reached such that further traversal is not possible, can be realized as follows (beginning from node 11) using the Parent-Child ID Map:

1. Locate node 3 in the Parent row of the Parent-Child ID Map. (i.e. columns 5 and 6).
2. Identify the corresponding child nodes from column 5 (i.e. node 6) and from column 6 (i.e. node 7).
3. Locate the identified child nodes in the Parent row of the Parent-Child ID Map (if present). Node 6 is not present in the Parent row of the Parent-Child ID Map, whilst node 7 is located in columns 9 and 10.
4. Identify the corresponding child nodes of node 7 from columns 9 and 10 (i.e. child nodes are nodes 10 and 11).
5. Locate nodes 10 and 11 in the Parent row of the Parent-Child ID Map (if present). Node 10 is not present in the Parent row, and node 11 is located in columns 11 and 12.
6. Locate the corresponding child nodes of node 11 in the Child row of the Parent-Child ID Map. The child nodes are in columns 11 and 12, and are nodes 12 and 13.
7. Locate nodes 12 and 13 in the Parent row of the Parent-Child ID Map. Neither node 12 nor node 12 is present in the Parent row of the Parent-Child ID Map. Further traversal is hence stopped.

The summary of the traversal starting from node 3 is:

3→6
3→7
7→10
7→11
11→12
11→13

The number of traversals involved is 6. The nodes involved in this traversal are 3, 6, 7, 10, 11, 12, and 13. In this manner, child-parent associations are also defined.

Figure 3:
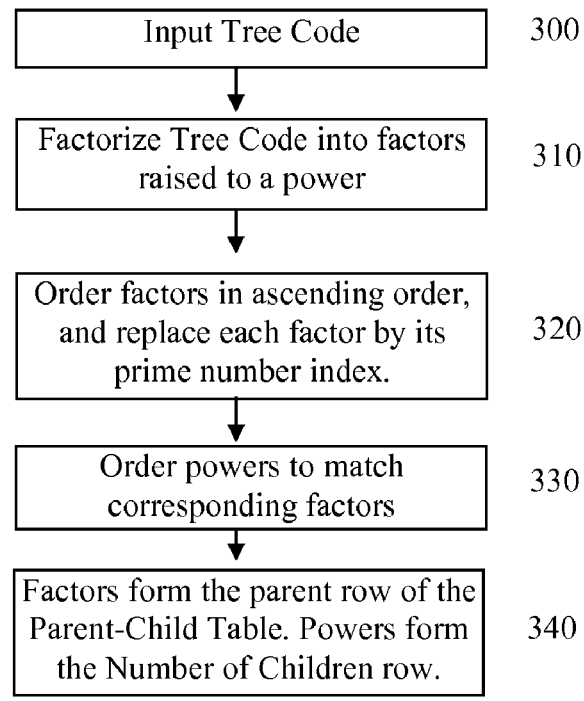
FIG. 3 illustrates an operation of generating a Parent-Child Table from a tree code.

The structure can be reconstructed from the Parent-Child Table or the Parent-Child ID Map, both of which can be derived from the tree code. As the Parent-Child Table and the Parent-Child ID Map are closely related, and inter-derivable, the Tree Code can be used to obtain both the Parent-Child Table and the Parent-Child ID Map. An operation to obtain the Parent-Child Table from the Tree Code is described with reference to the flow chart of FIG. 3, and includes the following steps:

1. Factorize the Tree Code and order the factors in the ascending order. The tree structure 100 of FIG. 1 has the Tree Code 30244688100. (Blocks 310, 320)

Tree Code =30244688100=$2^2*3^2*5^2*11^2*17^2*31^2$

The factors are hence: {2, 3, 5, 11, 17, 31}
2. Replace each factor by the prime number index it represents (Block 320). Thus 2→1st prime, 3→$2^{nd}$ prime, 5→$3^{rd}$ prime, 11→$5^{th}$ prime, 17→$7^{th}$ prime, and 31→$11^{th}$ prime.

The prime index is hence: {1, 2, 3, 5, 7, 11}.
3. Order the powers of the factor in the same order as the factors (Block 330).

The powers are: {2, 2, 2, 2, 2, 2}
4. The prime indices obtained in Step 2 form the Parent row in the Parent-Child Table. The powers obtained in Step 3 form the Number of Children row in the Parent-Child Table (Block 340).

The Parent-Child Table is hence obtained.

The Parent-Child ID Map is obtained from the Tree Code in the following manner:

1. Obtain the Parent-Child Table as per above.
2. Repeat each element in the Parent row by its power in the Number of Children row. In the above example, this gives: {1, 1, 2, 2, 3, 3, 5, 5, 7, 7, 11, 11}. This forms the Parent row of the Parent-Child ID Map.
3. The Child row is a sequence of natural numbers starting from 2. This gives {2, 3, 4, 5, 6, 7, 8, 9, 10, 11, 12, 13}. The Parent-Child ID Map is hence formed.

Tree manipulations/operations can be realized using the Parent-Child ID Map and the Parent-Child Table. Since the Parent-Child ID Map and the Parent-Child Table are derivable from the Tree Code, tree manipulation can be performed knowing only the Tree Code of a tree structure.

The Parent-Child ID Map and Parent-Child Table allow transformation and relabelling of tree structure. Transformation and relabelling may be performed when a tree structure is modified by addition and deletion of nodes, and/or a particular tree fragment is isolated from a tree structure. For example, the node IDs of a tree are preferably in sequential order such that a tree structure with 5 nodes will have node IDs 1, 2, 3, 4, 5. If, however, node 3 is deleted, a link in the Parent-Child ID Map is deleted and the tree is temporarily left with nodes 1, 2, 4, 5. The node IDs are hence in a non-sequential order.

Transformation is the process of bringing the node IDs from this non-sequential ordered state back to the normal state where the node IDs are in sequential order starting from a label 1 and ending with a label equal to the number of nodes in the tree structure. Transformation results in the relabelling of the nodes such that nodes with non-sequential shuffled node IDs are assigned new node IDs. Relabelling maps non-sequential node IDs to a normal sequence of node IDs.

Figure 4:
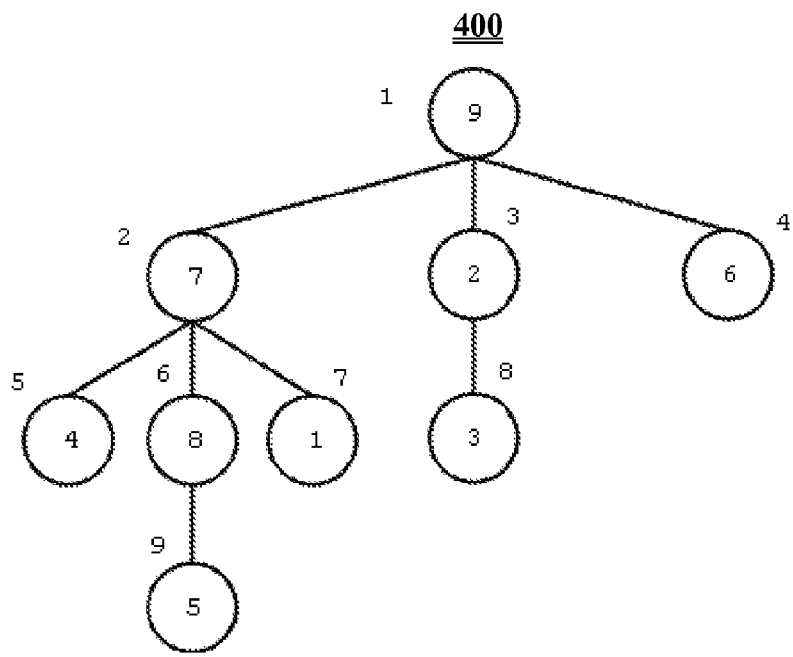
FIG. 4 shows a tree structure with unordered nodes.

FIG. 4, shows a tree structure 400 with non-sequential node IDs that have been shuffled due to a change in the tree structure. To transform and relabel the tree structure 400, a Relabel Map mapping the desired sequential node order with the current non-sequential/shuffled node numbers is generated.

These conditions are satisfied if nodes are added in a node-by-node manner, and transformation of the tree is performed after each addition of a node. Multiple nodes can be added simultaneously only if they are consecutive, and are added to the same node in the original tree.

The tree structure 400 contains non-sequential/shuffled nodes 9, 7, 2, 6, 4, 8, 1, 3, and 5. A Relabel Map that maps the desired breadth first sequential order of the tree to the current non-sequential/shuffled ordering is:

| Relabel Map | | | | | | | | | |
|---|---|---|---|---|---|---|---|---|---|
| Breadth First | 1 | 2 | 3 | 4 | 5 | 6 | 7 | 8 | 9 |
| Shuffled | 9 | 7 | 2 | 6 | 4 | 8 | 1 | 3 | 5 |

The Parent-Child ID Map of the shuffled tree structure, traversing in breadth-first manner is:

| Current Parent-Child ID Map | | | | | | | | |
|---|---|---|---|---|---|---|---|---|
| Parent Node ID | 9 | 9 | 9 | 7 | 7 | 7 | 2 | 8 |
| Child Node ID | 7 | 2 | 6 | 4 | 8 | 1 | 3 | 5 |

The first number in the parent row of the Parent-Child ID Map of the shuffled tree maps to 1 in the Relabel Map. The sequence of numbers in the child row of the Parent-Child ID Map of the shuffled tree maps to a sequence of numbers starting from 2.

In the above example:

9 maps to 1

7, 2, 6, 4, 8, 1, 3, 5, map respectively to 2, 3, 4, 5, 6, 7, 8, 9

Relabelling the nodes in the shuffled tree structure according to the above gives a new Parent-Child ID Map:

| New Parent-Child ID Map | | | | | | | | |
|---|---|---|---|---|---|---|---|---|
| Parent Node ID | 1 | 1 | 1 | 2 | 2 | 2 | 3 | 6 |
| Child Node ID | 2 | 3 | 4 | 5 | 6 | 7 | 8 | 9 |

The above generation of a new Parent-Child ID Map hence relabels and transforms the nodes to be in sequential ordering.

Tree Manipulation and Operation

Examples of tree manipulation, operations, and tree analysis using the Parent-Child ID Map and the Parent-Child Table are illustrated by way of the following examples. The Parent-Child Table and Parent-Child ID Map corresponding to the tree 100 of FIG. 1 are referred to for purposes of these examples, and are:

| Parent-Child ID Map | | | | | | | | | | | | |
|---|---|---|---|---|---|---|---|---|---|---|---|---|
| Parent Node ID | 1 | 1 | 2 | 2 | 3 | 3 | 5 | 5 | 7 | 7 | 11 | 11 |
| Child Node ID | 2 | 3 | 4 | 5 | 6 | 7 | 8 | 9 | 10 | 11 | 12 | 13 |
| Column No. (for reference) | 1 | 2 | 3 | 4 | 5 | 6 | 7 | 8 | 9 | 10 | 11 | 12 |

| Parent-Child Table | | | | | | |
|---|---|---|---|---|---|---|
| Parent Node ID | 1 | 2 | 3 | 5 | 7 | 11 |
| Number of children | 2 | 2 | 2 | 2 | 2 | 2 |
| Column No. (for reference) | 1 | 2 | 3 | 4 | 5 | 6 |

Operation 1: Determining the Number of Nodes and Links

The number of links in the tree structure is equal to the sum of the number of children of the Parent-Child Table. The number of links is hence:

2+2+2+2+2+2=12

Alternatively, the number of links in the tree can be determined from the Parent-Child ID Map since the number of links in the tree is equal to the size (i.e. number of columns) of the Parent-Child ID Map.

The number of nodes in the tree structure is equal to one more than the number of links.

Number of nodes=12+1=13

Operation 2: Determining the Level of a Node

The level of each node is defined as the number of upward traversals required to reach the root node from a specified nodes plus one. The level of a node is determined by performing a leftward traversal of the Parent-Child ID Map from the specified node, counting the number of traversals involved, and adding one to the count.

A leftward traversal from, for example, node 11 is:

11→7

7→3

3→1

As three traversals are involved, the level of node 11 is: 3+1=4.

Operation 3: Determining the Nodes in a Particular Level

The nodes in a particular level of a tree structure can be determined by finding the level of all nodes of the tree, (operation 2) and filtering out those nodes not belonging to the level under consideration.

Operation 4: Determining the Leaf Nodes of a Tree

The leaf nodes of a tree structure can be determined by comparing the Parent row and Child row of the Parent-Child ID Map. The nodes that belong to the Child row but not the Parent row are the leaf nodes of the tree. For the tree structure 100, the leaf nodes are nodes 4, 6, 8, 9, 10, 12 and 13.

Operation 5: Determining the Parent Nodes of a Tree

The Child row of the Parent-Child ID Map gives the set of all nodes of the tree structure except the root node. Adding the root node (node 1) to the set gives the set of all nodes of the tree structure. Performing operation 4 above to identify the leaf nodes of the tree structure, identifies the Parent nodes as the nodes belonging to the set of all nodes but not to the set of Leaf nodes.

With reference to the Parent-Child ID Map of the tree 100:

Set of all nodes S1={1, 2, 3, 4, 5, 6, 7, 8, 9, 10, 11, 12, 13}

Set of Leaf nodes S2={4, 6, 8, 9, 10, 12, 13}

The set of Parent nodes is therefore:

S3=Nodes belonging to S1 but not to S2={1, 2, 3, 5, 7, 11}

Operation 6: Determining the Children of a Parent

The children of a parent can be determined by identifying all columns in the Parent row of the Parent-Child ID Map containing the parent node ID. The corresponding elements in the Child row are the children of that parent node.

To find the children of node 7 of the tree 100:
1. Identify all columns in the Parent row of the Parent-Child ID Map referring to node 7. (i.e. column 9 and 10)
2. Obtain the corresponding node IDs of column 9 and 10 of the Child row of the Parent-Child ID Map. (i.e. nodes 10 and 11)

Nodes 10 and 11 are the children of node 7.

Operation 7: Determining the Ancestors of a Node

The ancestors of a node can be determined by:
1. Performing a leftwards traversal in the Parent-Child ID map starting with the node in question.
2. The nodes involved in the traversal, excluding the input node, are the ancestors of the node in question.

Assuming the node in question is node 11, the nodes involved in the leftward traversal of the Parent-Child ID Map are 1, 3, 7 and 11. Removing node 11 from this set gives the ancestors of node 11 as 1, 3 and 7.

To determine if a first node is an ancestor of a second node
1. Find all ancestors of the second node as per the above operation.
2. If the first node is present in the set obtained in Step 1, the first node is an ancestor of the second node.

For example, to determine if node 2 is an ancestor of node 10, the ancestors of node 10 are determined. As per the above operation, the ancestors of node 10 are $\{1, 3, 7\}$. As node 2 does not belong to this set, node 2 is determined not to be an ancestor of node 10.

Operation: 8 Determining the Descendants of a Node

The descendents of a node can be determined by:
1. Performing a rightward traversal of the Parent-Child ID map starting with the node in question.
2. Listing the nodes involved in the traversal excluding the input node gives all descendants of the input node.

For example, for node 3, the nodes involved in a rightward traversal of the Parent-Child ID Map are nodes 3, 6, 7, 10, 11, 12 and 13. Removing node 3 from this set gives the descendants of node 3 as 6, 7, 10, 11, 12 and 13.

To determine if a first node is a descendant of a second node:
1. Find all descendants of the second node as per above.
2. If the first node is present in the set obtained in Step 1, the first node is a descendant of the second node.

Operation 9: Determining the Path to a Leaf Node

To determine the path to a leaf node:
1. Find all ancestors of the leaf node (operation 7).
2. Add the leaf node to the end of the ancestor list.
3. List the set obtained in Step 2 in ascending order of node IDs.

For example, to find the path to leaf node 12 in the tree 100, the ancestors of node 12 are first determined. The ancestors are: $\{1, 3, 7, 11\}$ according to operation 7. Adding the leaf node 12 to this list gives 1, 3, 7, 11, 12. This list is already in ascending order of node IDs, and hence represents the path to leaf node 12.

Operation 10: Determining the Nodes of a Tree Fragment

To determine all nodes belonging to a tree fragment, a rightward traversal of the Parent-Child ID Map is performed beginning from the root node of the tree fragment. The nodes involved in the traversal are the nodes of the tree fragment.

For example, to find the nodes of fragment 7 (where 7 is the fragment ID/fragment root), the Parent-Child ID Map from node 7 is traversed rightward. The traversal involves nodes 7, 10, 11, 12, and 13. Nodes 7, 10, 11, 12, and 13 are hence the nodes of fragment 7.

To determine the first N nodes of the tree fragment:
1. Find all nodes belonging to the tree fragment as described above.
2. Select the first N nodes from the set of node IDs obtained in Step 1.

For example, to find the first 3 nodes of fragment 7:
1. Determine the nodes of fragment 7: $\{10, 11, 12, 13\}$.
2. The first 3 nodes of the above set are: $\{7, 10, 11\}$ This gives the first 3 nodes of the fragment 7.

To find the nodes of the $i^{th}$ sibling of the tree fragment:
1. Find the child nodes of the tree fragment (operation 6).
2. Find the $i^{th}$ sibling from the child nodes obtained in Step 1.
3. Treating the $i^{th}$ sibling as a new fragment root, find all nodes belonging to that tree fragment.
4. Add the original fragment root to the set obtained in Step 3.

This gives all the nodes of the $i^{th}$ sibling of the fragment.

For example, to find the nodes of the $2^{nd}$ sibling of fragment 7:
1. The child nodes of fragment 7 are 10 and 11. Node 10 is the $1^{st}$ sibling and node 11 is the $2^{nd}$ sibling.
2. The $2^{nd}$ sibling of node 7 is node 11.
3. Treating node 11 as a new fragment root, the nodes of this fragment are: 11, 12 and 13
4. Adding the original fragment root node (node 7) to this list gives: $\{7, 11, 12, 13\}$ To find the first N nodes of the $i^{th}$ sibling of the tree fragment:
1. Sort the nodes obtained when finding the nodes of the $i^{th}$ sibling of a tree fragment in ascending order of node IDs, and select the first N nodes.

For example, the first 3 nodes of the $2^{nd}$ sibling of fragment 7 are therefore: $\{7, 11, 12\}$ Operation 11: Determining the Tree Code of a Specified Tree Fragment Determination of the tree code of a specific tree fragment is described by way of the following example to the $2^{nd}$ sibling of the fragment of node 3 having 5 nodes.
1. Find the nodes of the tree fragment (operation 10). The nodes for this fragment are: $\{3, 7, 10, 11, 12\}$.
2. From the Parent-Child ID Map, select only those columns that have the nodes of the fragments in both the Parent and the Child rows. The selected columns are hence columns 6, 9, 10 and 11.

| Parent Node ID | 1 | 1 | 2 | 2 | 3 | 3 | 5 | 5 | 7 | 7 | 11 | 11 |
|---|---|---|---|---|---|---|---|---|---|---|---|---|
| Child Node ID | 2 | 3 | 4 | 5 | 6 | 7 | 8 | 9 | 10 | 11 | 12 | 13 |
| Column No. (for reference) | 1 | 2 | 3 | 4 | 5 | 6 | 7 | 8 | 9 | 10 | 11 | 12 |

3. Isolate the selected columns as a separate table

| Parent Node ID | 3 | 7 | 7 | 11 |
|---|---|---|---|---|
| Child Node ID | 7 | 10 | 11 | 12 |
| Column No. (for reference) | 1 | 2 | 3 | 4 |

4. Insert a new Child row for the new Parent-Child ID Map with natural numbers starting from 2, retaining the old Child row for further operation.

| Relabel Map | | | | |
|---|---|---|---|---|
| Parent Node ID | 3 | 7 | 7 | 11 |
| Child Node ID | 2 | 3 | 4 | 5 |
| Old Child Node ID | 7 | 10 | 11 | 12 |
| Column No. for reference | 1 | 2 | 3 | 4 |

5. The above operation establishes a mapping between the old Child node ID and the new Child node ID. This mapping is termed a Relabel Map.

The first entry of the Parent row is given node ID 1. The remaining entries of the Parent row are relabelled with IDs as per the Relabel Map. From the relabel mapping, node 7 should be relabelled as node 2, node 10 should be relabelled as node 3, node 11 should be relabelled as node 4, and node 12 should be relabelled as node 5.

The following new Parent-Child ID Map is obtained:

| Parent Node ID | 1 | 2 | 2 | 4 |
|---|---|---|---|---|
| Child Node ID | 2 | 3 | 4 | 5 |
| Column No. for reference | 1 | 2 | 3 | 4 |

6. Compute the Tree Code from the Parent-Child ID Map. As previously described, the Tree Code is calculated as:

$$\text{Tree Code} = p_1 * p_2 * p_2 * p_4 = 2*3*3*7 = 126$$

The tree code of the fragment of node 3, from the $2^{nd}$ sibling having 5 nodes is hence 126.

Operation 12: Determining a Tree Fragment Having a Particular Tree Code

A tree fragment having a particular tree code can be found by:
1. Finding all possible tree fragments (matching a specific criteria if applicable).
2. Computing the Tree Code of all the fragments obtained in 1 (operation 11).
3. Returning those fragments whose Tree Code match the input Tree Code.

For example, to match a Tree Code with all fragments having four nodes only, all fragments with 4 nodes only are first found in step 1 above. The Tree Code of each fragment (if any) is then calculated and compared with the input Tree Code.

Operation 13: Determining the Nearest Common Ancestor

The nearest common ancestor of a set of nodes is the smallest fragment containing all the specified nodes. For example, the nearest common ancestor of nodes 6, 10, and 11 is node 3, and the nearest common ancestor of nodes 3, 10, and 11 is also node 3.

To find the nearest common ancestor of a specific set of nodes:
1. Find the ancestors for each node in the specific set of node, (operation 7).
2. Add the node to its corresponding ancestor set.
3. Find the largest common node in this set.

For example, to find the nearest common ancestor of nodes 6, 10, and 11:
1. The ancestors of the input nodes are first found:
   6: {1,3}
   10: {1,3,7}
   11: {1,3,7}.
2. Adding the nodes themselves to their respective ancestor set gives:
   6: {1,3,6}
   10: {1,3,7,10}
   11: {1,3,7,11}.
3. The largest common node between all the node sets is 3. Hence 3 is the nearest common ancestor of all the node sets.

Operation 14: Determining the Parent of a Node

The parent of a node is determined as follows:
1. Locate the input node in question in the Child row of the Parent-Child ID Map.
2. The corresponding node in the Parent row of the Parent-Child ID Map in the same column gives the parent of the input node For example, to find the parent of node 7,
1. Node 7 is located in the Child row of the Parent-Child ID Map in column 6
2. The corresponding node in the Parent row in column 6 is 3, which is the parent of node 7

Operation 15: Determining the Tree Code After Subtracting a Subtree (Except the Root Node)

If a subtree with root node 2 is subtracted from the tree structure 100, nodes 4, 5, 8 and 9 are removed. To calculate the Tree Code of the tree after nodes 4, 5, 8 and 9 have been removed:
1. Find all the fragment nodes of the subtree (operation 10), namely, subtree nodes {2,4,5,8,9}.
2. From the Parent-Child ID Map, remove those columns that have the subtree nodes obtained in 1 in both the Parent and the Child rows. Hence, for the tree structure 100 of FIG. 1, columns 3, 4, 7, and 8 of the Parent-Child ID Map are removed.

The Parent-Child ID Map is hence:

| Parent-Child ID Map | | | | | | | | |
|---|---|---|---|---|---|---|---|---|
| Parent Node ID | 1 | 1 | 3 | 3 | 7 | 7 | 11 | 11 |
| Child Node ID | 2 | 3 | 6 | 7 | 10 | 11 | 12 | 13 |
| Column No. for reference | 1 | 2 | 3 | 4 | 5 | 6 | 7 | 8 |

3. Assign the Child row of the new Parent-Child ID Map with natural numbers starting from 2. The old Child row is retained for a latter operation. The Parent-Child ID Map is hence:

| Relabel Mapping | | | | | | | | |
|---|---|---|---|---|---|---|---|---|
| Parent Node ID | 1 | 1 | 3 | 3 | 7 | 7 | 11 | 11 |
| Child Node ID | 2 | 3 | 4 | 5 | 6 | 7 | 8 | 9 |
| Old Child Node ID | 2 | 3 | 6 | 7 | 10 | 11 | 12 | 13 |
| Column No. for reference | 1 | 2 | 3 | 4 | 5 | 6 | 7 | 8 |

4. From the previous step, a mapping is established between the old Child node ID and new Child node ID. This mapping is termed a re-label mapping. Mark the first entry of the Parent row is marked as 1. The other remaining entries of the Parent row are remapped with the relabel mapping.

From the relabel mapping, node 6 should be relabelled as node 4, node 7 should be relabelled as node 5, and so on. The Parent-Child ID Map is hence:

| Parent-Child ID Map | | | | | | | | |
|---|---|---|---|---|---|---|---|---|
| Parent Node ID | 1 | 1 | 3 | 3 | 5 | 5 | 7 | 7 |
| Child Node ID | 2 | 3 | 4 | 5 | 6 | 7 | 8 | 9 |
| Column No. for reference | 1 | 2 | 3 | 4 | 5 | 6 | 7 | 8 |

5. Compute the Tree Code from the Parent-Child ID Map.

Tree Code=$p_1^2 * p_3^2 * p_5^2 * p_7^2 = 4*25*121*289 = 3496900$

An important property of tree subtraction is that, as is apparent from the above, subtraction rearranges the Parent-Child ID Map of a tree. However the node IDs of the tree nodes, which are less than the fragment ID that is subtracted, remain unchanged.

Operation 16: Determining the Bottom Tree Fragment with N Nodes (n>1)

The steps to determine the bottom tree fragment of a tree structure are:
1. Determine the largest node of the tree structure (this is also the largest leaf node).
2. Create a variable to hold the current node and assign it to this node.
3. Determining the parent node of the current node (operation 14).
4. Determine all nodes of a fragment (fragment nodes) of the parent node (operation 10).
5. If the number of nodes of the fragment obtained in step 4 is equal to N, the parent node ID is returned as the fragment ID.

On the other hand, if the number of nodes of the fragment is greater than N, a bottom tree fragment with N node does not exist.

If the number of nodes of the fragment is less than N and the parent node is not 1, the current node is assigned as a parent node and the operation is repeated from step 3.

If the number of nodes of the fragment is less than N and the parent node is node 1, the process is terminated and it is determined that no bottom fragment node exists.

An operation to detect a bottom tree fragment with 5 nodes is illustrated with reference to the tree structure 100:
1. The largest node of the tree structure is 13.
2. The current node is set to 13.
3. The parent of the current node is 11.
4. The fragment nodes of the parent are {11,12,13}.
5. The number of fragment nodes of the parent is less than the required 5 nodes, therefore node 11 is assigned as the current node, and steps 3 to 5 are repeated.

Repeat:
3. The parent of the current node 11 is 7.
4. The fragment nodes of the parent node 7 are {7, 10, 11, 12, 13}
5. The number of fragment nodes obtained is equal to the required node 5. A bottom tree fragment with fragment ID 7 has been detected.

It is an important property of a subtraction of a bottom tree fragment that, if a bottom tree fragment is detected with N nodes at fragment ID fId_1, and this tree fragment is subtracted from the tree structure, all nodes of the tree structure having a node ID lower than fId_1 remain unchanged in the new tree structure. Subtraction only rearranges nodes having a higher ID than the fragment ID subtracted.

If a bottom tree fragment with N nodes exists at fragment ID fId_2 (where fId_2 is less then fId_1), it should be noted that node fId_2 is unchanged from subtraction operation of the previous fragment of fId_1. Therefore, if a further subtraction of a bottom tree fragment (with the same number of nodes), transformation of the tree structure, and collection of all the fragment IDs of the bottom tree fragment is repeated, all fragment IDs still refer to the original tree and remain unchanged by subtraction. This property is used in the detection of self-similarity within the tree structure, described further below.

For example, in the tree structure 100, if the bottom tree fragment with 5 nodes is subtracted, the fragment beginning at node 7 from the tree is subtracted. As a result of this subtraction, the tree is transformed (node IDs are reassigned). If a bottom tree fragment with 5 nodes is again to be subtracted, the fragment beginning at node 2 is subtracted. The transformation performed in the first subtraction operation does not change the node ID of node 2 because node ID 2 is a node lower than the first fragment having fragment ID 7. Further, any node with a node ID lower than the fragment ID subtracted remained unchanged by the first subtraction operation.

Operation 17: Addition of Nodes and Trees

The following illustrates an operation for adding N nodes to an existing node of a tree with a given Tree Code at the $i^{th}$ sibling sequence. Specifically, 2 nodes are added to node 3 at the $2^{nd}$ sibling sequence (i.e. between nodes 6 and 7) of the tree structure 100:

The Parent-Child ID Map of the tree 100 is again:

| Parent-Child ID Map | | | | | | | | | | | | |
|---|---|---|---|---|---|---|---|---|---|---|---|---|
| Parent Node ID | 1 | 1 | 2 | 2 | 3 | 3 | 5 | 5 | 7 | 7 | 11 | 11 |
| Child Node ID | 2 | 3 | 4 | 5 | 6 | 7 | 8 | 9 | 10 | 11 | 12 | 13 |
| Column No. for reference | 1 | 2 | 3 | 4 | 5 | 6 | 7 | 8 | 9 | 10 | 11 | 12 |

Addition of the nodes is realized as follows:
1. Locate the column number of node 3 in the Parent-Child ID Map where it occurs for the first time. (e.g. column 5)
2. Add the sibling sequence number to the column number obtained in 1, and subtract 2 therefrom. This gives the new column number after which the new nodes will be added in the Parent-Child ID Map.

2+5−2=5

3. Increment the node IDs of the Child row of the Parent-Child ID Map from column 5+1 (i.e. column 6) to the last column by the number of nodes to be added (i.e. 2). The old Child Node IDs are retained for a latter operation.

| Relabel Map | | | | | | | | | | | | |
|---|---|---|---|---|---|---|---|---|---|---|---|---|
| Parent Node ID | 1 | 1 | 2 | 2 | 3 | 3 | 5 | 5 | 7 | 7 | 11 | 11 |
| Child Node ID | 2 | 3 | 4 | 5 | 6 | 9 | 10 | 11 | 12 | 13 | 14 | 15 |
| Old Child Node ID | 2 | 3 | 4 | 5 | 6 | 7 | 8 | 9 | 10 | 11 | 12 | 13 |
| Column No. for reference | 1 | 2 | 3 | 4 | 5 | 6 | 7 | 8 | 9 | 10 | 11 | 12 |

4. The columns whose values are incremented represent a Relabel Map mapping the old Child Node IDs to the new Child Node IDs. The node IDs of the Parent row are updated according to this new mappings.
The nodes of the Parent Node ID row are hence relabelled:
7→9
8→10
9→11
10→12
11→13
12→14
13→15
Updating the Parent row of the Parent-Child ID Map with these mappings gives:

| Parent Node ID | 1 | 1 | 2 | 2 | 3 | 3 | 5 | 5 | 9 | 9 | 13 | 13 |
|---|---|---|---|---|---|---|---|---|---|---|---|---|
| Child Node ID | 2 | 3 | 4 | 5 | 6 | 9 | 10 | 11 | 12 | 13 | 14 | 15 |
| Old Child Node ID | 2 | 3 | 4 | 5 | 6 | 7 | 8 | 9 | 10 | 11 | 12 | 13 |
| Column No. for reference | 1 | 2 | 3 | 4 | 5 | 6 | 7 | 8 | 9 | 10 | 11 | 12 |

5. The 2 nodes inserted after column 5 are inserted as columns 5+1, and 5+2. The parent node ID (node 3) is entered as the Parent Node ID of the new columns.
The node IDs of the Child row of the Parent-Child ID Map are reassigned with a consecutive sequence of natural numbers starting with 2. The Child Node ID entries of the newly added columns are hence also assigned node IDs.

| Parent-Child ID Map | | | | | | | | | | | | | | |
|---|---|---|---|---|---|---|---|---|---|---|---|---|---|---|
| Parent Node ID | 1 | 1 | 2 | 2 | 3 | 3 | 3 | 3 | 5 | 5 | 9 | 9 | 13 | 13 |
| Child Node ID | 2 | 3 | 4 | 5 | 6 | 7 | 8 | 9 | 10 | 11 | 12 | 13 | 14 | 15 |
| Column No. for reference | 1 | 2 | 3 | 4 | 5 | 6 | 7 | 8 | 9 | 10 | 11 | 12 | 13 | 14 |

6. Compute the Tree Code from the Parent-Child ID Map obtained in 5.

Tree Code=$2^2*3^2*5^4*11^2*23^2*41^2$=4*9*625*121*529*1681 32 2420980402500

The addition of trees is realized in a node-by-node manner, and the tree structure is transformed after each node addition. Multiple nodes can be added at one time only if the nodes are consecutive and added to the same node in the original tree.

The position in the Parent-Child ID Map at which a node is added is determined from the Parent-Child ID Map of the transformed tree. During addition, the node to be added is temporarily assigned a node ID, which is one greater than the number of nodes in the tree to which the node is added. If multiple consecutive nodes are added to the same node in the original tree, multiple consecutive node IDs are temporarily assigned. The first node ID is one greater than the number of nodes in the tree to which the nodes are added.

Figure 5A:
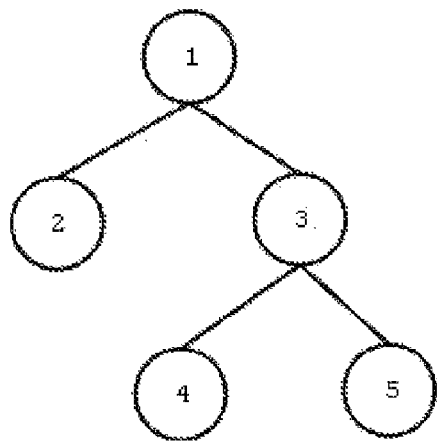
FIGS. 5A-5C illustrate an operation of adding nodes and trees.
Figure 5B:
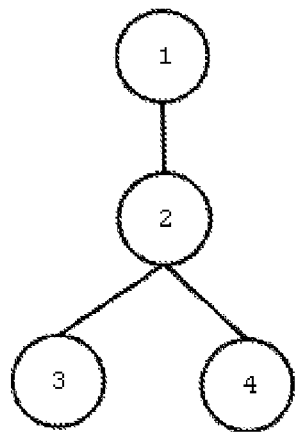
Figure 5C:
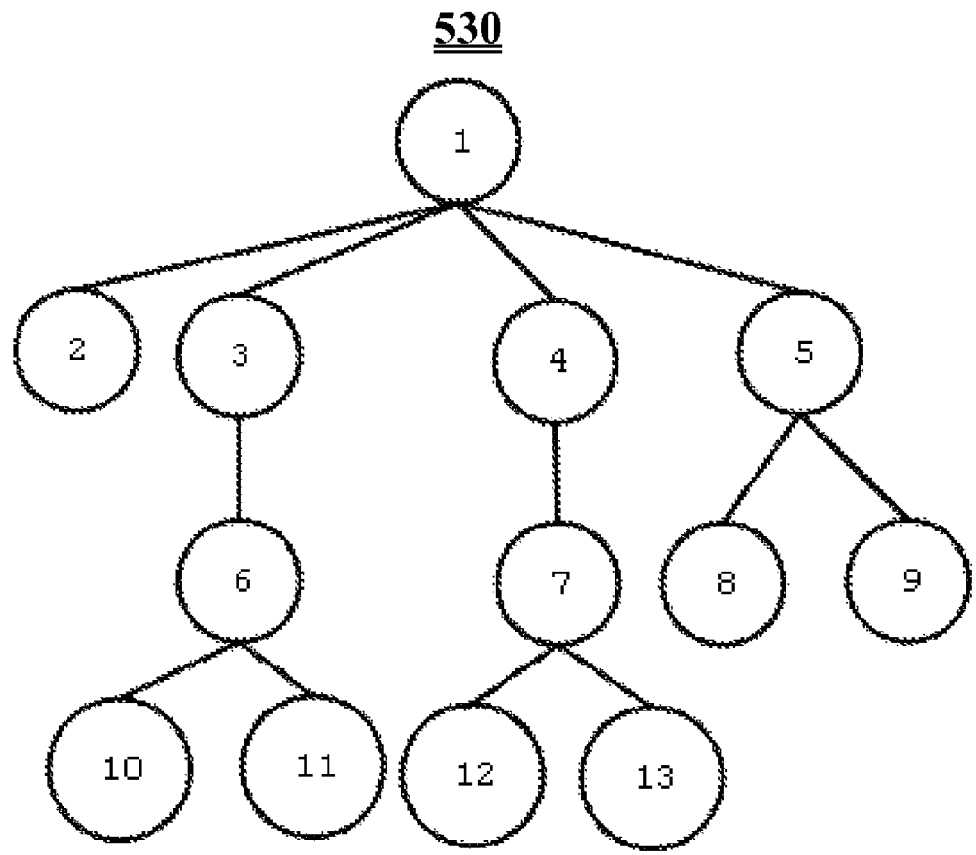

FIGS. 5A to 5C illustrate the operation for the addition of trees 510, 520 and the notation involved. T1 and T2 are two trees represented in FIGS. 5A and 5B by respective Tree Codes 100 and 18. T is the tree obtained by adding two instances of T2 to T1. The resultant tree T after addition of the two trees T1 and T2 is illustrated in FIG. 5C The addition of a single node from T2 to T1 is realized in the following manner:

1. Locate the position in the Parent-Child ID Map of T1 where the node of T2 is to be added. The first node of T2 should be added to node 1, as the $2^{nd}$ sibling. This tree position corresponds to the 2nd column after link 1→2 in the Parent-Child ID Map of T1.
2. Assign a new node ID to the node being added. The new node ID is one greater than the number of nodes in T1. The node to be added is hence assigned a node ID of 6 (since T1 currently has 5 nodes).
3. Create a new column in the Parent-Child ID Map in the position identified in Step 1 which represents the new link It should be noted that since only a single node is being added, the Parent-Child ID Map links are still in the breadth-first order:

| Parent ID | 1 | 1 | 1 | 3 | 3 |
|---|---|---|---|---|---|
| Child ID | 2 | 6 | 3 | 4 | 5 |

The column shaded grey illustrates the new node addition.

4. Transform the Parent-Child ID Map of Step 3. The transformation also generates a Relabel Map.

Transformed Parent-Child ID Map of T1 after addition of new node:

| Old Parent ID | 1 | 1 | 1 | 3 | 3 |
|---|---|---|---|---|---|
| Parent ID | 1 | 1 | 1 | 4 | 4 |
| Child ID | 2 | 3 | 4 | 5 | 6 |
| Old Child ID | 2 | 6 | 3 | 4 | 5 |

Relabel Map:

| Old Node ID | New Node ID |
|---|---|
| 3 | 4 |
| 4 | 5 |
| 5 | 6 |
| 6 | 3 |

From the Relabel Map, node 6 is transformed to node 3 in the new tree. Therefore, the second node of T2 is added to node 3 of the transformed tree.

The remaining nodes of T2 are added to T1 as per the above operation. T1 is transformed after each node addition.

Operation 18: Determining the Leaf Nodes of a Tree Fragment

The leaf nodes of a tree fragment, given the Tree Code and the fragment ID, can be determined as follows:
1. Find all leaf nodes of the tree structure (operation 4).
2. Find the nodes of the tree fragment (operation 10).
3. The nodes obtained in Step 1 which are in common to those obtained in Step 2 are the leaf nodes of the tree fragment.

Operation 19: Deletion of Fragments

Deletion of fragments can be realized with one operation for all nodes to be deleted.

The following example illustrates the operation for deleting fragment 4 from the tree 530 of FIG. 5C.
1. Determine all fragment nodes of the tree fragment (operation 10). The fragment nodes are: 4, 7, 12, and 13.
2. The columns of the Parent-Child ID Map of the tree 530 that contain the fragment nodes identified in Step 1 are removed:

| Parent-Child ID Map | | | | | | | |
|---|---|---|---|---|---|---|---|
| Parent ID | 1 | 1 | 1 | 3 | 5 | 5 | 6 | 6 |
| Child ID | 2 | 3 | 5 | 6 | 8 | 9 | 10 | 11 |

3. The Parent-Child ID Map obtained in Step 2 is transformed:

| | | | | | | | | |
|---|---|---|---|---|---|---|---|---|
| Old Parent ID | 1 | 1 | 1 | 3 | 5 | 5 | 6 | 6 |
| Parent ID | 1 | 1 | 1 | 3 | 4 | 4 | 5 | 5 |
| Child ID | 2 | 3 | 4 | 5 | 6 | 7 | 8 | 9 |
| Old Child ID | 2 | 3 | 5 | 6 | 8 | 9 | 10 | 11 | using a Relabel Map of:

| Old Node ID | New Node ID |
|---|---|
| 5 | 4 |
| 6 | 5 |
| 8 | 6 |
| 9 | 7 |
| 10 | 8 |
| 11 | 9 |

Operation 20: Sorting Node IDs in Depth-First Order

When nodes of a tree-structure based document, such as an XML document, are read in the order in which the nodes appear in the document, the nodes are traversed in the depth-first order in the document tree. However the node IDs represented by the above operations are of a breadth-first order. An operation to sort node IDs in depth-first order is hence advantageous in tree-structure based document processing.

Figure 6:
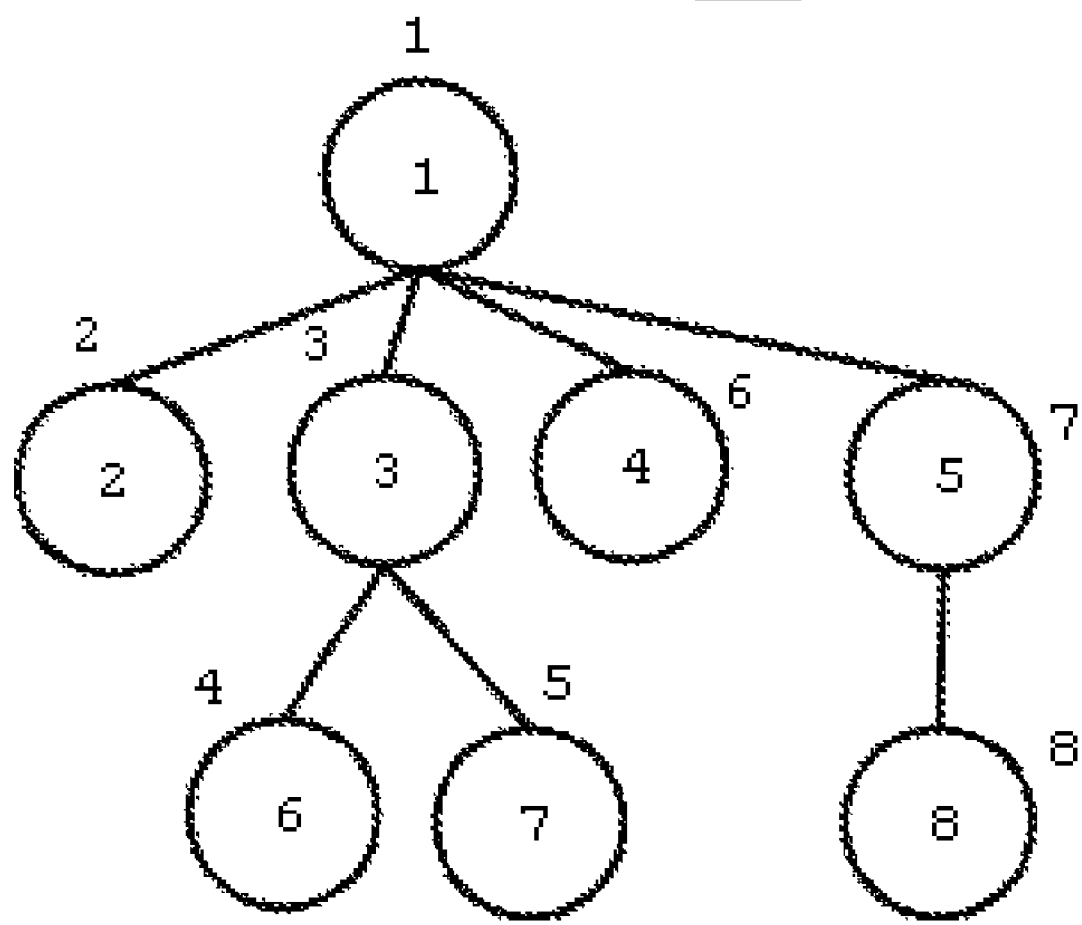
FIG. 6 shows a tree structure to which depth-first ordering is applied.

An operation to sort node IDs in depth-first order is illustrated with reference to the tree 600 of FIG. 6. The node IDs provided inside the nodes of the tree 600 are node IDs assigned in Breadth-First ordering. The node IDs provided outside the nodes are node IDs assigned in Depth-First ordering. The Breadth-First ordering of the nodes is: 1, 2, 3, 4, 5, 6, 7, 8, while the Depth-First ordering of the nodes is: 1, 2, 3, 6, 7, 4, 5, 8.

The Parent-Child ID Map of the tree 600 is:

| Parent-Child ID Map (breadth-first) | | | | | | | |
|---|---|---|---|---|---|---|---|
| Parent Node ID | 1 | 1 | 1 | 1 | 3 | 3 | 5 |
| Child Node ID | 2 | 3 | 4 | 5 | 6 | 7 | 8 |

1. A Parent-Child Relationship Map is generated from the Parent-Child Map. The Parent-Child Relationship Map has as keys the parent node ID, and as values, the child node IDs of the parent node.

Parent-Child Relationship Map (breadth-first)

| Parent Node ID | Child Node IDs |
|---|---|
| 1 | 2, 3, 4, 5 |
| 3 | 6, 7 |
| 5 | 8 |

2. From the lowermost row of the Parent-Child Relationship Map, the key and corresponding values are obtained. The key and value of the lowermost row are 5 and 8, respectively.
3. Search for the key obtained in Step 2, in the value column (Child Node IDs column) in the upper rows. The key 5 occurs in the value column in the first row
4. Append the value(s) obtained in Step 2 to the values of the row found in Step 3, after the value matching that of the key obtained in step 2 (i.e. after the value '5'). This makes the value of the first row (with key 1): 2, 3, 4, 5, 8
5. Delete the lowermost row from the Parent-Child Relationship Map. The Parent-Child Relationship Map is hence:

| Parent Node ID | Child Node IDs |
|---|---|
| 1 | 2, 3, 4, 5, 8 |
| 3 | 6, 7 |

6. Repeat steps 2 to 5 until the table has only one row. This yields:

| Parent Node ID | Child Node IDs |
|---|---|
| 1 | 2, 3, 6, 7, 4, 5, 8 |

7. Append the values of the first row to the key of the first row. This yields the sequence of nodes {1, 2, 3, 6, 7, 4, 5, 8}, which, as given above, is the Depth-First order of node IDs Operation 21: Obtaining Leaf Nodes in Depth-First Order Obtaining leaf nodes of a tree in depth-first order is illustrated with reference to the tree 600 of FIG. 6. The Breadth-First order of leaf nodes is: 2, 4, 6, 7, 8, while the Depth-First order of leaf nodes is: 2, 6, 4, 5, 8.
1. Obtain the leaf nodes of the tree in Breadth-First order (operation 4). The leaf nodes are: 2, 4, 6, 7, 8
2. Sort all nodes of the tree into Depth-First order (operation 20). The Depth-First order of node IDs obtained is hence: 1, 2, 3, 6, 7, 4, 5, 8

3. From the list obtained in Step 2, delete the non-leaf nodes by comparing the list with that obtained in Step 1. The Depth-First order of leaf nodes is hence obtained as 2, 6, 4, 5, 8.

Operation 22: Isolating and Transforming a Fragment

During query operations, it may be required to isolate and transform a fragment. This involves cutting off a fragment from the tree and representing the fragment as an independent tree with its own transformed Parent-Child ID Map. An isolation and transformation operation is illustrated with reference to fragment 3 of tree 530 in FIGS. 5A-5C:

1. Obtain all nodes of the tree fragment (operation 10). This gives nodes 3, 6, 10, 11.
2. From the Parent-Child ID Map of the tree 530, identify all columns having the fragment nodes obtained in Step 1 in both the parent and child row. This yields a shuffled Parent-Child ID Map of:

| Parent ID | 3 | 6 | 6 |
|---|---|---|---|
| Child ID | 6 | 10 | 11 |

3. Transform the Parent-Child ID Map obtained in Step 2 using the Relabel Map of:

| Old Node ID | New Node ID |
|---|---|
| 3 | 1 |
| 6 | 2 |
| 10 | 3 |
| 11 | 4 | gives the new Parent-Child ID Map, and hence new tree, of:

| Old Parent ID | 3 | 6 | 6 |
|---|---|---|---|
| Parent ID | 1 | 2 | 2 |
| Child ID | 2 | 3 | 4 |
| Old Child ID | 6 | 10 | 11 |

Operation 23: Detecting and Utilizing Self-Similarity

Self-Similarity is a phenomenon in which a unit pattern repeats itself within a system in such a way that the pattern in the individual part of the system is the same as the pattern in the whole system. When the unit pattern that repeats is exactly the same every time, the self-similarity is exact. By detecting self-similarity (self-similar units) in a tree, the tree can be substantially reduced in size. If all self-similar units are identical in terms of node names/values, a tree may be stored as a single self-similar unit, and its tree structure described based on self-similarity.

Figure 7A:
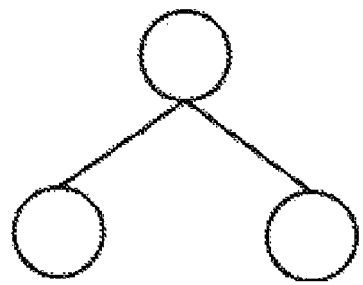
FIGS. 7A-7C illustrate self-similar units within the tree structure of FIG. 1
Figure 7A:
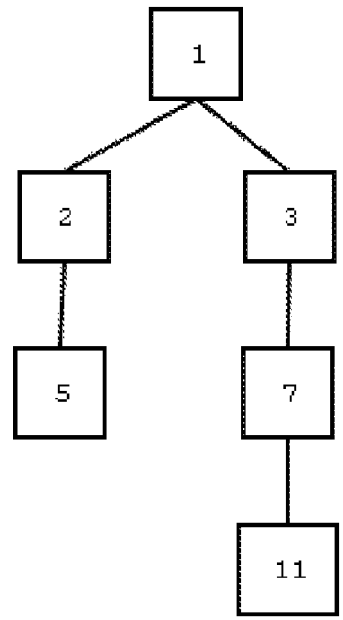
Figure 7B:
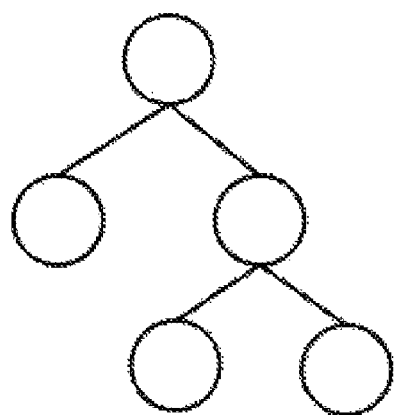
Figure 7B:
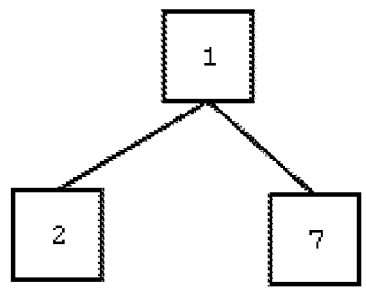
Figure 7C:
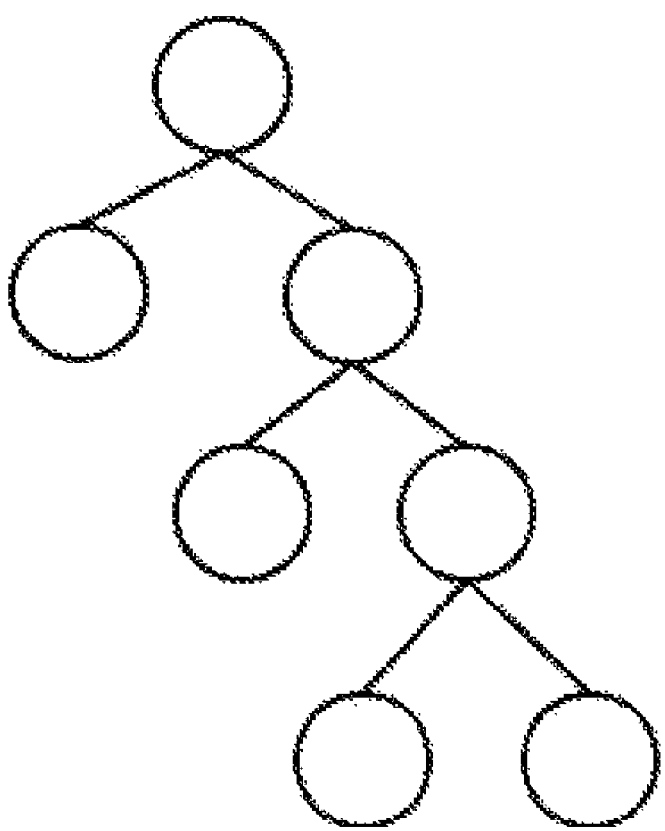
Figure 7C:
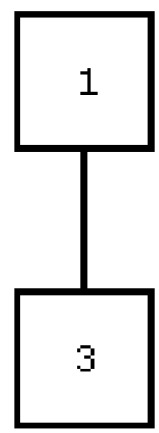

The tree 100 of FIG. 1 has exact self-similarity, as shown in FIGS. 7A-7C.

The self-similar unit 710 has the following properties:

| Number of nodes: | 3 |
|---|---|
| Location of self-similar units: | 1, 2, 3, 5, 7, 11 |
| Nodes of the unit from location 1: | 1, 2, 3 |
| Nodes of the unit from location 2: | 2, 4, 5 |
| Nodes of the unit from location 3: | 3, 6, 7 |
| Nodes of the unit from location 5: | 5, 8, 9 |

| -continued | |
|---|---|
| Nodes of the unit from location 7: | 7, 10, 11 |
| Nodes of the unit from location 11: | 11, 12, 13 |
| Tree Code of self-similar units: | 4 |

The tree 100 can be represented in units of self-similar unit 810, as shown by block tree 820.

The self-similar unit 730 has the following properties:

| Number of nodes: | 5 |
|---|---|
| Location of self-similar units: | 1, 2, 7 |
| Nodes of the unit from location 1: | 1, 2, 3, 6, 7 |
| Nodes of the unit from location 2: | 2, 4, 5, 8, 9 |
| Nodes of the unit from location 7: | 7, 10, 11, 12, 13 |
| Tree Code of self-similar units: | 100 |

The tree 100 can be represented in units of self-similar unit 730, as shown by block tree 740.

The self-similar unit 750 has the following properties:

| Number of nodes: | 7 |
|---|---|
| Location of self-similar units: | 1, 3 |
| Nodes of the unit from location 1: | 1, 2, 3, 4, 5, 8, 9 |
| Nodes of the unit from location 3: | 3, 6, 7, 10, 11, 12, 13 |
| Tree Code of self-similar units: | 12100 |

The tree 100 can be represented in units of self-similar unit 750, as shown by block tree 760.

The tree 100 therefore has self-similarities with 3, 5 and 7 nodes. The self-similar unit in FIG. 7A has 3 nodes, that of FIG. 7B has 5 nodes, and that of FIG. 7C has 7 nodes. The self-similar units are shown as sub-trees of the main tree. The location of the self-similar units are given by the fragment ID of the sub-tree. For example, a self-similar unit with 5 nodes can be found at fragments 1, 2 and 7 of the tree. This is evident if the sub-tree with 5 nodes is visualized as attached to the main tree at node IDs 1, 2 and 7. For example, from location 1, the sub-tree with 5 nodes consists of nodes 1, 2, 3, 6, and 7.

Tree Codes for the self-similar units can be determined. For example, the Tree Code of the self-similar unit 730 with 5 nodes is 100. The repetition of unit patterns in the tree makes the tree a self-similar tree.

A tree structure is defined as exactly self-similar, if it satisfies the following conditions:

Condition 1: The tree consists of more than one sub-tree which has the same Tree Code. These sub-trees are termed as self-similar units of the main tree. The root node of these sub-trees are termed as the root of the corresponding self-similar units.

Condition 2: One of the self-similar unit starts from the root of the main tree.

Condition 3: The root of every self-similar unit begins from the leaf node of another self-similar unit, except the first unit described in condition 2 which starts from the root of the main tree.

Figure 8:
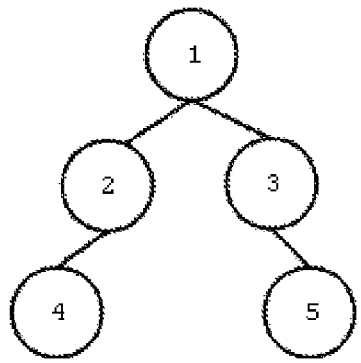
FIG. 8 shows a tree without self-similarity.
Figure 9:
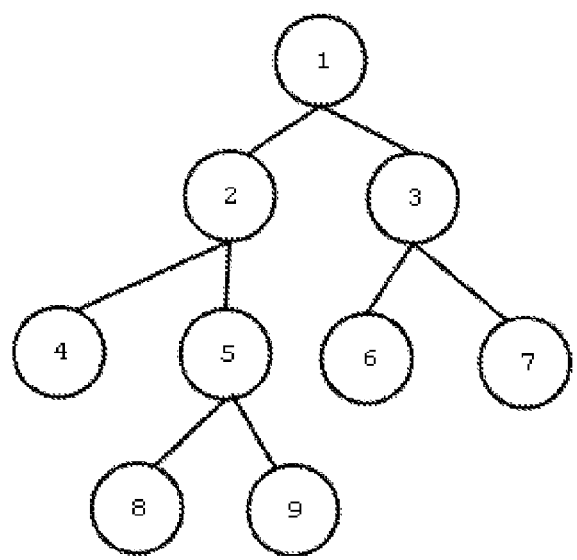
FIG. 9 shows a tree having been subjected to transformation.

Condition 4: All the nodes of a tree should be contained within a self-similar unit FIG. 8 shows a tree structure 800 that is not self-similar though it may initially appear that nodes 1, 2, and 4 and nodes 1, 3, and 5 are self-similar. The nodes, however, violate condition 3 of self-similarity.

Determining Self-Similarity

An operation for determining the self-similarity details of a tree with exact self-similarity is illustrated. Such details include:
1. The number of nodes of each self-similar unit,
2. The fragment ID of each self-similar unit,
3. All the node IDs of each self-similar unit,
4. The Tree Code of each self-similar unit.

The input to the operation is the Tree Code of the tree whose self-similarity needs to be determined and the number of nodes of the self-similar unit N to be detected.

Referring to the tree 100 of FIG. 1 having a Tree Code of 30244688100:

The number of edges of the tree is N−1, where N is the number of nodes in the tree. If a self-similar tree has m self-similar units with k edges, then the total number of edges in the tree is k*m. Therefore, as the tree 100 has 12 edges, there could be:
- 2 self-similar units with 6 edges (or 7 nodes),
- 3 self-similar units with 4 edges (or 5 nodes),
- 4 self similar units with 3 edges (or 4 nodes), or
- 6 self-similar units with 2 edges (or 3 nodes).

The number of edges of a self-similar unit should be a factor of the number of edges of the tree. This places a constraint on the number of nodes of a self-similar unit. Therefore if the number of edges of a tree is a prime number, the tree cannot have self-similar units. With the tree 100, the valid number of nodes a self-similar unit may have is therefore 3, 4, 5 and 7.

Detecting self-similarity in a tree for a self-similar unit with N nodes
1. Generate a Parent-Child ID Map from the Tree
2. Determine the number of edges and nodes from the Parent-Child ID Map
3. Check the validity of the number of nodes. If the number of nodes is outside of the constraint, no self-similarity is present in the tree and the operation ends
4. Detect the bottom fragment of the tree with N nodes (operation 16)
   Condition 1: If the bottom tree fragment does not exist, then there is no self-similarity in the tree,
   Condition 2: If the bottom tree fragment exists, add the fragment ID of the bottom fragment to the self-similar fragment ID list.
      i. Condition 2a: If the bottom tree fragment ID is 1, return the self-similar fragment ID list. This list then gives all fragment IDs of the self-similar units.
      ii. Condition 2b: If the bottom tree fragment ID is not 1, subtract the tree fragment with this fragment ID from the tree (operation 15)
   Step 4 is repeated until either Condition 1 or Condition 2 is fulfilled as an exit criteria.

If Condition 1 of Step 4 is fulfilled, the self-similar fragment ID list gives the fragment IDs of all the self-similar units of the tree with the self-similar units having N nodes. Step 4 of the above operation is illustrated with reference to the tree 100 of FIG. 1.

Figure 10:
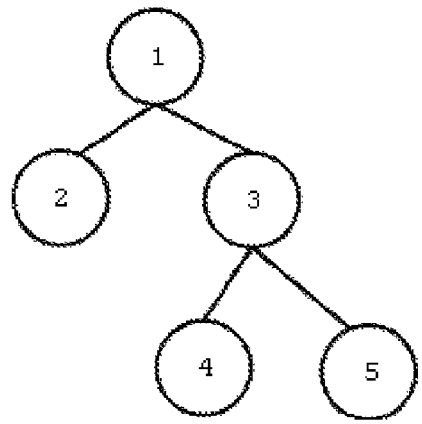
FIG. 10 shows a tree having been subjected to transformation

After the first bottom 5-node fragment subtraction, the transformed tree is as shown in FIG. 10. The node ID of the original tree from where the tree fragment is substrate is referred to as the fragment ID of subtraction, and is 7.

Figure 11:
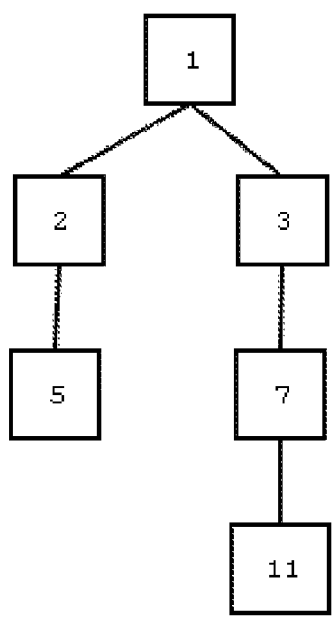
FIG. 11 shows a tree where self-similar units are depicted as blocks.

After the second bottom 5-node fragment subtraction from the transformed tree 100, a new transformed tree as obtained is shown in FIG. 11. The fragment ID of subtraction is 2

As the fragment ID of the 5-node bottom tree fragment of the remaining tree in FIG. 11 is 1, the process stops after reaching this root node and returns the fragment ID list of self-similar units (after sorting) as {1, 2, 7}.

Detecting All Self-Similar Units Within a Given Tree

The operation to detect all self-similar units is an extension of the above described operations. The input to this operation is the Tree Code of the tree and the steps are:
1. Generate the Parent-Child ID Map from the Tree Code.
2. Determine the number of edges and nodes from the Parent-Child ID Map.
3. If the number of edges is a prime number the tree is not self-similar.
4. If the number of edges of the tree is not a prime number, determine all mathematical factors of the number of edges of the tree.
5. For each factor determine the number of nodes of probable self-similar unit by incrementing it by 1. This provides a list of the number of nodes of probable self-similar units.
6. For each probable number of nodes obtained in Step 5, detect self-similarity using the operation as previously described.
7. If the tree has self-similarity, a list of fragment IDs of self-similar units against each number of nodes will be returned.
8. For each fragment ID and number of nodes of self-similar units, obtain the other details of self-similar units.

Hence, the following details can be obtained:
1. The number of nodes of each self-similar unit: already obtained.
2. The fragment ID of each self-similar unit: already obtained.
3. All the node IDs of each self-similar unit: obtained by the operation described above "Detecting self-similarity of a tree with N Nodes in the self-similar unit".
4. Tree Code of each self-similar unit: obtained by the operation of Example 11.

Finding the Tree Code of a Second Level Tree (Tree Within a Tree)

Figure 12:
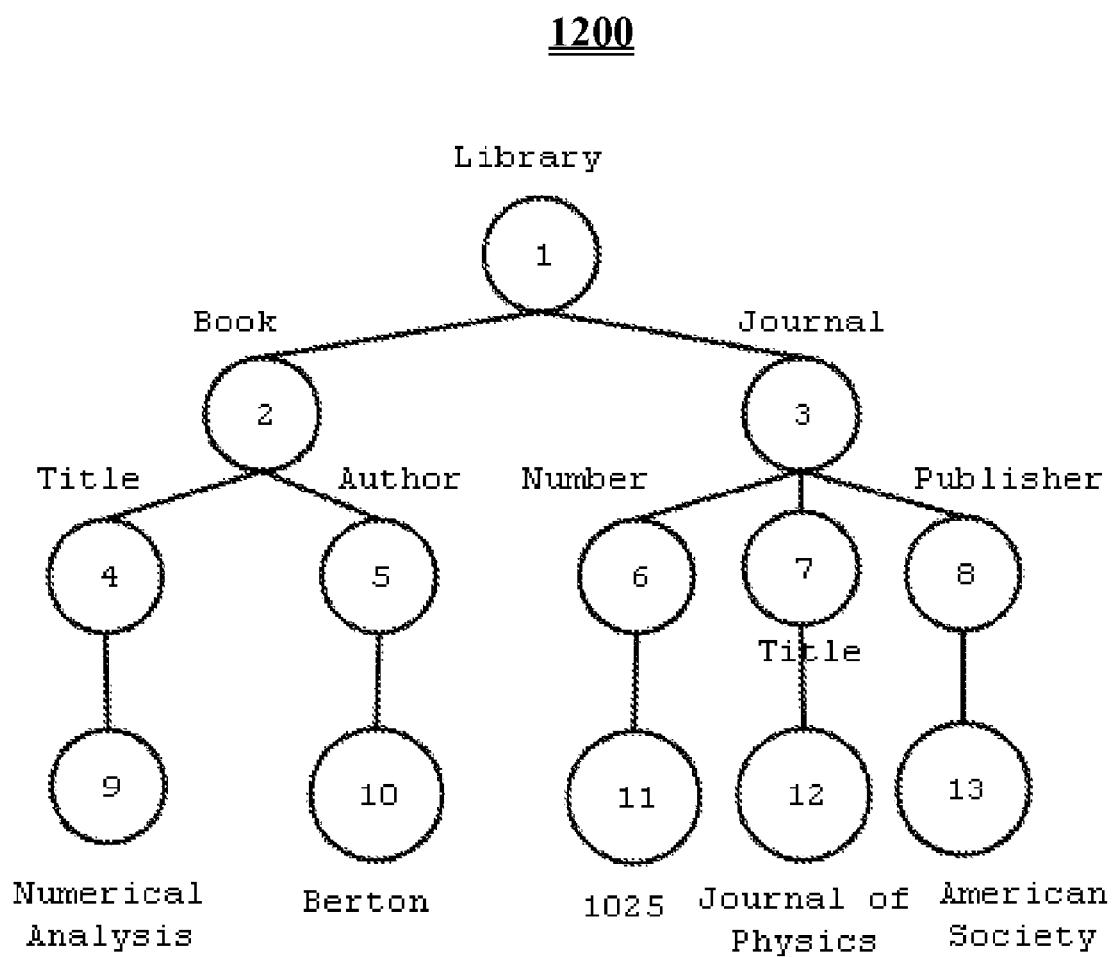
FIG. 12 shows a tree representing XML data.

In the tree 100, replacing self-similar units with 3 nodes with blocks results in a tree structure as shown in FIG. 12. In FIG. 12, each block represents a self-similar unit. The Tree Code of such the tree structure can be found follows:
1. The fragment IDs of all self-similar units of the tree structure for a particular number of nodes are already known from the above operations. The fragment IDs of self-similar unites with 3 nodes are {1, 2, 3, 5, 7, 11}.

For each fragment ID obtained in Step 1, find the nearest ancestor that is also present in the same set. All ancestors of a node can be obtained by the operation described in Example 7. The ancestors with the highest node ID, which is also present in the above set, is the nearest ancestor.

After Step 1, the nearest ancestors are:
1→No ancestor
2→1
3→1
5→2
7→3
11→7

2. Form a Parent-Child ID Map with the mapping obtained in Step 1:

| Parent-Child ID Map | | | | | |
| --- | --- | --- | --- | --- | --- |
| Parent Node ID | 1 | 1 | 2 | 3 | 7 |
| Child Node ID | 2 | 3 | 5 | 7 | 11 |
| Column No. for reference | 1 | 2 | 3 | 4 | 5 |

3. Recreate the Child row with sequence of natural numbers starting from 2. The old Child Node IDs are retained for a latter operation.

| Parent-Child ID Map | | | | | |
| --- | --- | --- | --- | --- | --- |
| Parent Node ID | 1 | 1 | 2 | 3 | 7 |
| Child Node ID | 2 | 3 | 4 | 5 | 6 |
| Old Child Node ID | 2 | 3 | 5 | 7 | 11 |
| Column No. for reference | 1 | 2 | 3 | 4 | 5 |

From the above table, a mapping between the old Child Node ID and the new Child Node ID is established. This forms a Relabel Map mapping of:

5→4
7→5
11→6

4. Update the Parent row with new node IDs from the relabel map.

| Parent-Child ID Map | | | | | |
| --- | --- | --- | --- | --- | --- |
| Parent Node ID | 1 | 1 | 2 | 3 | 5 |
| Child Node ID | 2 | 3 | 4 | 5 | 6 |
| Column No. for reference | 1 | 2 | 3 | 4 | 5 |

5. Compute the Tree Code from the Parent Child ID Map.

Tree Code=4*3*5*11=660

By replacing the self-similar units in a tree, a new tree is obtained smaller than the original tree. The process of detecting self-similarity within this new tree can be repeated. If exact self-similarity is detected in this new tree and each self-similar unit is identical, the tree can be further compressed by replacing the self-similar units and obtaining yet another tree. In this manner, storage compression can be realized if the self-similar units map exactly in terms of a node names/values, such as if the self-similar units are identical molecules.

For example, the original tree may be a large molecule, and by detecting self-similarities the structure of the original molecule can be stored in terms of self-similar molecules, leading to storage compression. The more the levels of self-similarity with identical self-similar units, the more the storage compression.

The above described tree encoding scheme and corresponding operation library can be applied to tree structure based documents, such as XML documents and object trees in object-oriented programming languages. Information about the tree can be queried based on tree structure, without parsing the tree.

The following exemplary XML data represents a Library with a Book and a Journal fragment.

| Node ID | Node Name/Value |
| --- | --- |
| 1 | Library |
| 2 | Book |
| 3 | Title |
| 4 | Numerical Analysis |
| 5 | Author |
| 6 | Berton |
| 7 | Journal |
| 8 | 1025 |
| 9 | Journal of Physics |
| 10 | Publisher |
| 11 | American Society |

The XML data is represented by the tree 1200 of FIG. 12.

The tree code of the Library is represented as <Library> and the tree codes of the Book and Journal fragments as <Book> and <Journal> respectively. At the time of design, the tree code of the <Book> and the <Journal> fragments are kept different for differentiating those fragments during structure-based query.

The above trees may be stored in a simplified form, and information queried based on structural semantics.

The tree code of the Library is stored with a mapping of the node IDs to the node names/values. The mapping of node IDs to node names/values is:

| Node ID | Node Name/Value |
| --- | --- |
| 1 | Library |
| 2 | Book |
| 3 | Journal |
| 4 | Title |
| 5 | Author |
| 6 | Number |
| 7 | Title |
| 8 | Publisher |
| 9 | Numerical Analysis |
| 10 | Berton |
| 11 | 1025 |
| 12 | Journal of Physics |
| 13 | American Society |

Structure-based queries are illustrated by the following tree operation examples.

EXAMPLE 1

Find All the Nodes of the Journal

A structure-based query to achieve this is to find the nodes of the fragment with tree code <Journal> within the tree code <Library>. Utilizing the tree operations hereinbefore described, the node IDs are: 3, 6, 7, 8, 11, 12 and 13. These node IDs are mapped to Journal, Number, Title, Publisher, 1025, Journal of Physics and American Society using the mapping maintains in the above table.

EXAMPLE 2

Find the Title of the Book Fragment

Step 1: Find All the Nodes of the Book Fragment

A structure-based query to achieve this is to find the nodes of the fragment with tree code <Book> within the tree code <Library>. Using the tree operations hereinbefore described, the node IDs are: 2, 4, 5, 9, 10

Step 2: From the Table Find the Node ID Which Represents the Title Node.

By looking up the table it is determined that node 4 represents Title.

Step 3: Find the Child of the Node Found in Step 2.

The equivalent structure-based query finds the child of node 4 in the tree code <Library>. Using the operations as hereinbefore described, node 9 is returned.

Step 4: From the Table, Find the Value of the Node Determined in Step 3.

By looking up the table, it is found that node 9 has the value Numerical Analysis, which is the required Title.

EXAMPLE 3

If multiple Book and Journal fragments exists in Library XML, the nodes of the second Book fragment can be determined by representing the equivalent structure-based query as <Library>/<Book>[2]. The query refers to the second fragment with tree code <Book> within the tree code <Library>. Using the tree operations as hereinbefore described, all fragments with tree code <Book> inside the tree code <Library> are determined, and the node IDs of the second fragment returned.

EXAMPLE 4

Comparison of whether two XML documents are structurally equivalent, is achieved by comparing their tree codes.

The above examples illustrate the following advantages:

Simplified Storage

Trees can be stored (in whichever form it may be embodied) in a simplified form in which the tree code, and a mapping between the node IDs and node names/values, are stored. The simplification is achieved in the form of less storage space as well as a uniform method of storage for trees of heterogeneous embodiments, such as XML documents, object trees, and the like.

Structure-Based Query

Trees can be queried based on structural semantics. The operations hereinbefore described support a wide variety of structure-based queries and operations, which a user may employ. Also as illustrated in Example 2 above, a label path-based query to obtain the value of Library/Book/Title can be reduced to a structure-based query in a multi-step process. Hence query processing is not limited to structure-based queries, but may also be applied to label-path-based queries if such queries can be reduced to equivalent structure-based queries with intermediate comparisons with table values.

Indexing

The operations described are computation based. To increase processing speed, some of the intermediate computational results can be pre-stored and fetched from memory when required. This leads to the concept of indexing.

For example, to find all the nodes of the fragment whose tree code is <Journal> inside the <Library> tree code, it is required to compute the tree code of all possible fragments and select the <Journal> fragment(s) therefrom. With the example Library XML, the tree fragment of node 2 is first calculated, and found to be related to <Book> and hence rejected. Then the tree fragment of node 3 is computed which is found to be related to <Journal> and hence accepted.

Instead of multiple computations the following results can be pre-stored. In this example, it is ensured that the tree code <Book> is different to the tree code <Journal> at the time of design.

| Root Node ID of fragment | Tree Code of fragment |
|---|---|
| 2 | <Book> |
| 3 | <Journal> |

The above pre-stored results form part of the indexing scheme.

Figure 13:
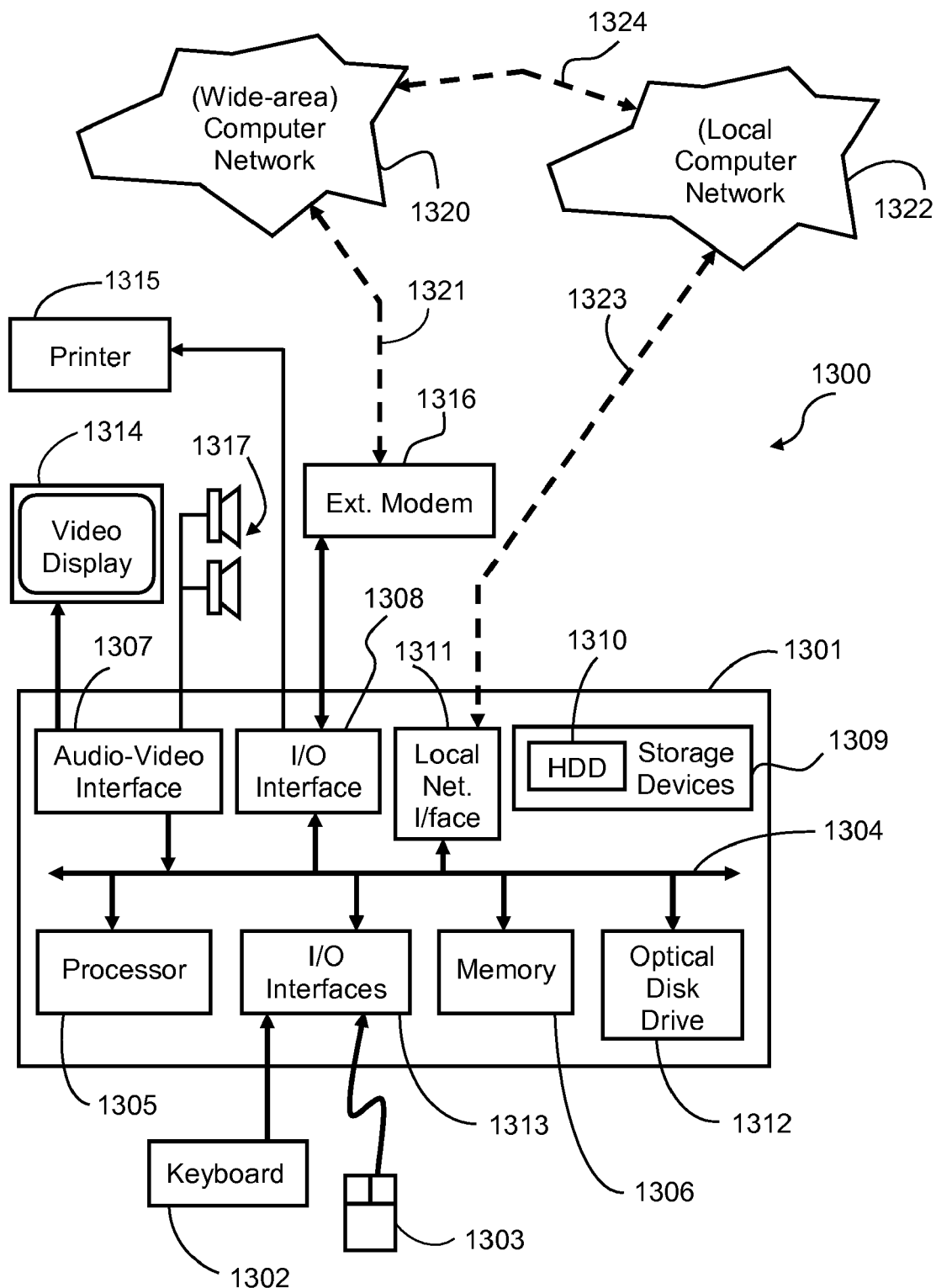
FIG. 13 is a schematic block diagram of a general purpose computer with which embodiments of the invention can be practiced.

The above embodiments may be implemented using a computer system 1300, such as that shown in FIG. 13. The processes described may be implemented as software, such as, as one or more application programs executable within the computer system 1300. In particular, the steps of the process may be realized by instructions in the software that are carried out within the computer system 1300. The instructions may be formed as one or more program code modules, each for performing one or more particular tasks. The software may be stored in a computer readable medium, including the storage devices described below, for example. The software is loaded into the computer system 1300 from the computer readable medium, and then executed by the computer system 1300. A computer readable medium having such software or computer program recorded on it is a computer program product. The use of the computer program product in the computer system 1300 preferably effects an advantageous apparatus for transferring, storing, and manipulating tree-based data, such as XML data.

As seen in FIG. 13, the computer system 1300 is formed by a computer module 1301, input devices such as a keyboard 1302 and a mouse pointer device 1303, and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The network 1320 may be a wide-area network (WAN) such as the Internet or a private WAN. Where the connection 1321 is a telephone line, the modem 1316 may be a traditional "dial-up" modem. Alternatively, where the connection 1321 is a high capacity (e.g. cable) connection, the modem 1316 may be a broadband modem. A wireless modem may also be used for wireless connection to the network 1320.

The computer module 1301 typically includes at least one processor unit 1305, and a memory unit 1306 for example formed from semiconductor random access memory (RAM) and read only memory (ROM). The module 1301 also includes a number of input/output (I/O) interfaces including an audio-video interface 1307 that couples to the video display 1314 and loudspeakers 1317, an I/O interface 1313 for the keyboard 1302 and mouse 1303 and optionally a joystick (not illustrated), and an interface 1308 for the external modem 1316 and printer 1315. In some implementations, the modem 1316 may be incorporated within the computer module 1301, for example within the interface 1308. The computer module 1301 also has a local network interface 1311 which, via a connection 1323, permits coupling of the computer system 1300 to a local computer network 1322, known as a Local Area Network (LAN). As also illustrated, the local network 1322 may also couple to the wide area network 1320 via a connection 1324, which would typically include a so-called "firewall" device or similar functionality. The network interface 1311 may be formed by an Ethernet™ circuit card, a wireless Bluetooth™ or an IEEE 802.11 wireless arrangement.

The interfaces 1308 and 1313 may afford both serial and parallel connectivity, the former typically being implemented according to the Universal Serial Bus (USB) standards and having corresponding USB connectors (not illustrated). Storage devices 1309 are provided and typically include a hard disk drive (HDD) 1310. Other devices such as a floppy disk drive and a magnetic tape drive (not illustrated) may also be used. An optical disk drive 1312 is typically provided to act as a non-volatile source of data. Portable memory devices, such optical disks (eg: CD-ROM, DVD), USB-RAM, and floppy disks for example may then be used as appropriate sources of data to the system 1300.

The components 1305, to 1313 of the computer module 1301 typically communicate via an interconnected bus 1304 and in a manner which results in a conventional mode of operation of the computer system 1300 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1310 and read and controlled in execution by the processor 1305. Intermediate storage of such programs and any data fetched from the networks 1320 and 1322 may be accomplished using the semiconductor memory 1306, possibly in concert with the hard disk drive 1310. In some instances, the application programs may be supplied to the user encoded on one or more CD-ROM and read via the corresponding drive 1312, or alternatively may be read by the user from the networks 1320 or 1322. Still further, the software can also be loaded into the computer system 1300 from other computer readable media. Computer readable media refers to any storage medium that participates in providing instructions and/or data to the computer system 1300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The operations disclosed may alternatively be implemented in dedicated hardware such as one or more integrated circuits performing the functions or sub functions of the described processes. Such dedicated hardware may include graphic processors, digital signal processors, or one or more microprocessors and associated memories.

We claim:

1. A method for encoding a tree, via a processor executing code, the method comprising:

receiving, via a processor, an input tree comprising a plurality of nodes, organized in a parent-child hierarchy, a parent node coupled to one or more child nodes;

assigning, via the processor, a node ID to each of the plurality of nodes of the input tree;

generating, via the processor, a representation between each parent node and the each of the child node associated with the parent node;

computing, via the processor, a tree code from prime numbers in the natural sequence of numbers, and the assigned node IDs to each of the parent node and child nodes, wherein the tree code is computed according to the formula:

$$\text{Tree Code} = p_{n1}^{m1} * p_{n2}^{m2} * \ldots * p_{nk}^{mk}$$

where, $p_{ni}$ is the $ni^{th}$ prime number in the natural sequence of numbers, ni is the node ID of the $i^{th}$ parent node in the parent-child table, and mi is the number of children of the $i^{th}$ parent node in the parent-child table;

and storing the tree code representative of the input tree.

2. The method of claim 1, wherein generating a representation between each parent node and the child nodes associated with the parent node comprises creating a parent-child table between each parent node of the input tree and the child nodes associated with the parent node.

3. The method of claim 2, wherein the parent-child table comprises a parent row and a child row, wherein the parent row comprises each of the indices of the prime numbers of the tree code and the child row comprises each of the associated powers of the prime numbers.

4. A method for decoding a tree, the method comprising:

receiving a tree code;

factorizing the tree code into one or more prime numbers in ascending order, each prime number factor being raised to an associated power;

replacing each prime number by a respective prime number index;

creating a parent-child table comprising a parent row and a child row, the parent row containing each of the prime number indices and the child row containing each of the associated powers; and creating a parent-child ID map comprising a parent row and a child row, the parent row of the parent-child ID map comprising each element of the parent row of the parent-child table, and the child row of the parent-child ID map comprising a sequence of natural numbers commencing from the integer 2, where each element of the parent row occurrence is repeated a number of times equivalent to the corresponding associated powers of the child row.

5. The method of claim 4, wherein the structure of the parent-child ID map is such that each column of the parent-child ID map corresponds to a parent-child node hierarchy, wherein a parent node ID belongs to the parent row and the corresponding child node ID to the child row.

6. The method of claim 5, wherein a parent node comprises multiple child nodes, and each parent-child node hierarchy is represented as a separate column in the parent-child ID map in order of sibling sequence in the tree.

7. The method of claim 4, wherein the parent-child table, the parent-child ID map, and tree code are inter-derivable from any one of the other.

8. The method of claim 4, further comprises determining the number of nodes and edges of the decoded tree wherein the number of edges in the tree structure is equal to the sum of the number of children of the parent-child table and number of nodes in the tree structure is equal to one more than the number of edges.

9. The method of claim 4, further comprises
determining the level of a specified node of the decoded tree, which comprises the steps of
performing a traversal of the parent-child ID map from the specified node to a root node of the tree;
counting the number of traversals involved; and
adding one to the count.

10. The method of claim 4, further comprises
determining the leaf nodes of the decoded tree wherein leaf nodes of the tree structure are determined by comparing the parent row and child row of the parent-child ID map, and the nodes belonging to the child row and not the parent row are considered to be the leaf nodes of the tree.

11. The method of claim 4, further comprises
determining the ancestors of a specified node of the decoded tree, which comprises the steps of
performing a traversal in the parent-child ID map starting with the specified node, wherein the nodes involved in the traversal, excluding the input node provides the ancestors of the node.

12. The method of claim 4, further comprises
determining the descendants of a node of the decoded tree, which comprises the step of
performing a traversal of the parent-child ID map starting with an input node, wherein the nodes involved in the traversal excluding the input node provides the descendants of the input node.

13. The method of claim 4, further comprises
determining the nodes of a tree fragment of the decoded tree, wherein traversal of the parent-child ID map is performed beginning with a root node of the tree fragment and nodes involved in the traversal are determined to be the nodes of the tree fragment.

14. The method of claim 4, further comprises
determining the tree code of a specified tree fragment of the decoded tree, which comprises the steps of
finding nodes of the tree fragment;
selecting from the parent-child ID map only those columns that have the nodes of the fragments in both the parent rows and the child rows;
isolating the selected columns as a separate table;
inserting a new child row for the new parent-child ID map with natural numbers commencing from an integer 2, and retaining the old child row for next operation;
establishing a relationship between the old child node ID and the new child node ID;
creating a new parent row by relabelling old parent node IDs by comparing with the relationship between the old child node ID and the new child node ID;
removing the old child row and the old parent row, thereby creating a parent-child ID map of the tree fragment which is now isolated from the main tree;
creating a parent-child table from the parent-child ID map; and
computing the tree code for the tree fragment for the parent-child table.

15. The method of claim 4, further comprises
determining a tree fragment of a specified tree code of the decoded, which comprises the steps of
finding all possible tree fragments by matching a specific criteria;
computing the tree code of all the tree fragments by finding the nodes of the tree fragment;
selecting from the parent-child ID map only those columns comprising nodes of the fragments in both the parent rows and the child rows;
isolating the selected columns as a separate table;
inserting a new Child row for the new parent-child ID map with natural numbers commencing from an integer 2, and retaining the old child row for next operation;
establishing a relationship between the old child node ID and the new child node ID;
creating a new parent row by relabelling old parent node IDs by comparing with the relationship between the old child node ID and the new child node ID;
removing the old child row and the old parent row, creating a parent-child table from the parent-child ID map;
computing the tree code for the tree fragment for the parent-child table; and
returning the fragment ID whose tree code matches the input tree code.

16. The method of claim 4, further comprises
adding two or more trees of the decoded tree comprising the steps
(a) obtaining the parent-child ID map of the two or more trees;
(b) determining a column in a first parent-child ID map belonging to a first tree where a node of a second tree is to be inserted;
(c) reorganizing the first parent-child ID map after insertion of the node of the second tree, to its original format, where the child row of the parent-child ID map is a sequence of natural number commencing from the integer 2;
repeating steps (b) and (c) for all nodes of the second tree;
determining a tree code for the combined parent-child ID map.

17. The method of claim 4, further comprises
deleting a tree fragment from a decoded tree, which comprises the steps of
performing a traversal of the parent-child ID map beginning from a root node of the tree fragment and nodes involved in the traversal are determined to be the nodes of the tree fragment;
removing columns of the parent-child ID map of the tree containing fragment nodes;
reorganizing the first parent-child ID map after removing the fragment nodes to its original format, where the child row of the parent-child ID map is a sequence of natural number commencing from the integer 2;
determining a tree code for the combined parent-child ID map.

18. The method of claim 4, further comprises
sorting nodes IDs in depth-first order of a decoded tree, which comprises the steps of
creating a parent-child relationship map from the parent-child map, the parent-child relationship map comprising a parent node ID as keys and child node IDs as values;
obtaining the key and corresponding values from the lowermost row of the parent-child relationship map;
searching for the key obtained in the value column of the parent-child relationship map;
appending the corresponding value obtained to the value of the row found after searching for the key;

deleting the lowermost row from the parent-child relationship map; repeating the above step until the parent-child relationship map comprises only one row; and appending the values of the row to the key.

19. The method of claim 4, further comprises detecting N node self similarity of a decoded tree, which comprises the steps of (a) determining the number of edges and nodes from the parent-child ID map, wherein the number of edges in the tree structure is equal to the sum of the number of children of the parent-child table and number of nodes in the tree structure is equal to one more than the number of edges;

(b) validating if N node self similarity exists for the tree and performing step (c) only if the tree has N-node self-similarity; go to step (d);

(c) detecting the N node bottom fragment of the tree, wherein
    if the bottom tree fragment does not exist, then there is no N node self-similarity in the tree or
    if the bottom tree fragment exists, recording a fragment ID of the bottom fragment;

(d) subtracting the bottom fragment from the tree after recording the fragment ID;

repeating the steps (c) and (d) until the fragment ID of the last subtracted bottom fragment is the root node of the tree.

* * * * *